(12) United States Patent
Kikkawa et al.

(10) Patent No.: US 10,077,837 B2
(45) Date of Patent: Sep. 18, 2018

(54) CONTROL DEVICE AND CONTROL METHOD FOR CONTINUOUSLY VARIABLE TRANSMISSION

(71) Applicant: AISIN AW CO., LTD., Anjo-shi, Aichi-ken (JP)

(72) Inventors: Akihiro Kikkawa, Anjo (JP); Masaki Ueda, Kariya (JP); Masachika Kato, Anjo (JP)

(73) Assignee: AISIN AW CO., LTD., Anjo (JP)

(\*) Notice: Subject to any disclaimer, the term of this patent is extended or adjusted under 35 U.S.C. 154(b) by 273 days.

(21) Appl. No.: 15/118,255

(22) PCT Filed: Sep. 25, 2014

(86) PCT No.: PCT/JP2014/075472
§ 371 (c)(1),
(2) Date: Aug. 11, 2016

(87) PCT Pub. No.: WO2015/136750
PCT Pub. Date: Sep. 17, 2015

(65) Prior Publication Data
US 2017/0146119 A1    May 25, 2017

(30) Foreign Application Priority Data
Mar. 10, 2014    (JP) ................. 2014-046868

(51) Int. Cl.
*F16H 61/662* (2006.01)
*F16H 59/42* (2006.01)
(Continued)

(52) U.S. Cl.
CPC .......... *F16H 61/662* (2013.01); *F16H 59/18* (2013.01); *F16H 59/42* (2013.01); *F16H 59/44* (2013.01);
(Continued)

(58) Field of Classification Search
None
See application file for complete search history.

(56) References Cited

U.S. PATENT DOCUMENTS

| 4,836,056 A | 6/1989 | Nakawaki et al. |
| 6,662,096 B2 * | 12/2003 | Komiyama ............... B60K 6/46 701/54 |

(Continued)

FOREIGN PATENT DOCUMENTS

| JP | H07-102791 B2 | 11/1995 |
| JP | 2005-140174 A | 6/2005 |

(Continued)

OTHER PUBLICATIONS

Dec. 22, 2014 Search Report issued in International Patent Application No. PCT/JP2014/075472.

*Primary Examiner* — Colby M Hansen
(74) *Attorney, Agent, or Firm* — Oliff PLC

(57) ABSTRACT

A control device for a continuously variable transmission, which sets a target input rotational speed, or a target value of an input rotational speed of the continuously variable transmission mounted on a vehicle, such that a speed ratio is changed in a stepped manner and which controls the continuously variable transmission such that the input rotational speed becomes equal to the target input rotational speed.

20 Claims, 9 Drawing Sheets

(51) Int. Cl.
*F16H 59/18* (2006.01)
*F16H 59/44* (2006.01)

(52) U.S. Cl.
CPC ............. *F16H 2061/66204* (2013.01); *F16H 2061/66213* (2013.01)

(56) References Cited

U.S. PATENT DOCUMENTS

| | | | | |
|---|---|---|---|---|
| 7,189,185 | B2 * | 3/2007 | Schlecht | B60W 30/18 477/54 |
| 8,517,890 | B2 * | 8/2013 | Hayashi | B60K 6/445 477/3 |
| 8,527,166 | B2 * | 9/2013 | Tamura | F16H 61/66259 477/46 |

FOREIGN PATENT DOCUMENTS

| | | |
|---|---|---|
| JP | 2008-069951 A | 3/2008 |
| JP | 2008-095906 A | 4/2008 |
| JP | 2009-103224 A | 5/2009 |
| JP | 2009-185869 A | 8/2009 |
| JP | 2010-007749 A | 1/2010 |
| JP | 2012-026362 A | 2/2012 |
| JP | 2013-200003 A | 10/2013 |

\* cited by examiner

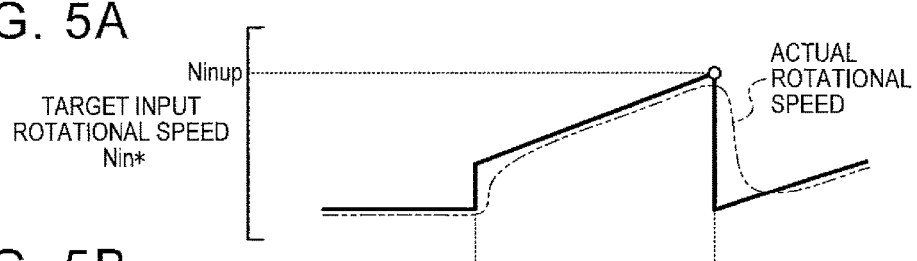
FIG. 5A
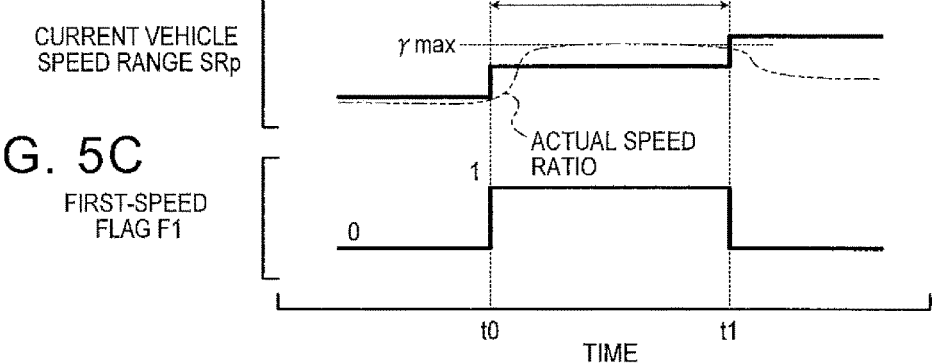
FIG. 5B
FIG. 5C

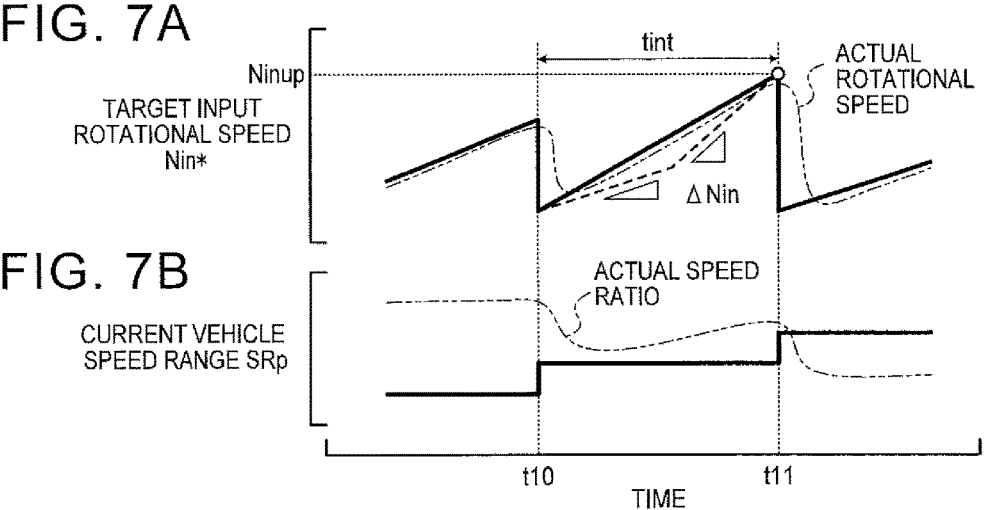

CONTROL DEVICE AND CONTROL METHOD FOR CONTINUOUSLY VARIABLE TRANSMISSION

BACKGROUND

The present disclosure relates to control devices and control methods for continuously variable transmissions that are mounted on vehicles.

Conventionally, a control device that changes a target input rotational speed of a continuously variable transmission in a stepped manner to perform a stepped upshift when the target input rotational speed reaches an upshift determination value and to perform a stepped downshift as the accelerator operation amount increases is known as this type of control devices for continuously variable transmissions (e.g., Japanese Patent Application Publication No. 2013-200003). This control device calculates a target input rotational speed by adding, to a base rotational speed as a reference, a vehicle speed correction value that is set such that the vehicle speed correction value increases as the vehicle speed increases and an accelerator operation amount correction value that is set such that the accelerator operation amount correction value increases as the accelerator operation amount increases. In order to change the target input rotational speed in a stepped manner, this control device calculates the accelerator operation amount correction value by using the accelerator operation amount that changes in a stepped manner, and updates the value of the base rotational speed at specific timings.

SUMMARY

In the case where the target input rotational speed is set as in the above conventional control device in order to change the speed ratio of a continuously variable transmission in a stepped manner, the accelerator operation amount correction value contributes less to a change in target input rotational speed if the accelerator operation amount (the amount by which an accelerator pedal is depressed) is approximately constant. Moreover, the vehicle speed correction value contributes less to a change in target input rotational speed if the vehicle speed converges (acceleration decreases) with the accelerator pedal being depressed. Accordingly, in the above conventional control device, it is difficult to set the target input rotational speed such that the target input rotational speed matches driver's intention to accelerate when changing the speed ratio of the continuously variable transmission in a stepped manner, and it is thus difficult to provide a satisfactory feel of acceleration, unless the base rotational speed is set appropriately. However, Japanese Patent Application Publication No. 2013-200003 discloses no procedures of setting the base rotational speed. The conventional control device for a continuously variable transmission therefore has room for improvement in terms of providing a better feel of acceleration and improved drivability of a vehicle equipped with the continuously variable transmission.

An exemplary aspect of the present disclosure provides a better feel of acceleration and improved drivability of a vehicle equipped with a continuously variable transmission.

A control device for a continuously variable transmission according to the present disclosure is a control device for a continuously variable transmission, which sets a target input rotational speed, or a target value of an input rotational speed of the continuously variable transmission mounted on a vehicle, such that a speed ratio is changed in a stepped manner and which controls the continuously variable transmission such that the input rotational speed becomes equal to the target input rotational speed, the control device including: an electronic control unit that includes control logic, which when executed: obtains a current accelerator operation amount and a current vehicle speed; obtains a current vehicle speed range corresponding to the current accelerator operation amount and the current vehicle speed from a plurality of vehicle speed ranges that are determined for each accelerator operation amount by dividing a possible vehicle speed range for the accelerator operation amount into a plurality of ranges; obtains an increase gradient corresponding to the current accelerator operation amount and the current vehicle speed range from increase gradients of the input rotational speed which are determined for the plurality of vehicle speed ranges for each accelerator operation amount; sets, at a timing the speed ratio is changed to an upshift side in a stepped manner, the target input rotational speed to a value lower than a current input rotational speed; and sets, after the input rotational speed is set, the target input rotational speed such that the input rotational speed changes according to the increase gradient obtained.

This control device for the continuously variable transmission obtains a current vehicle speed range corresponding to the current accelerator operation amount and the current vehicle speed from the plurality of vehicle speed ranges that are determined for each accelerator operation amount by dividing a possible vehicle speed range for each accelerator operation amount into a plurality of ranges, namely obtains a vehicle speed range including the current vehicle speed from the plurality of vehicle speed ranges corresponding to the current accelerator operation amount. This control device also obtains an increase gradient corresponding to the current accelerator operation amount and the current vehicle speed range from the increase gradients of the input rotational speed which are determined for the plurality of vehicle speed ranges for each accelerator operation amount. This control device sets, at the timing the speed ratio is changed to the upshift side in a stepped manner, the target input rotational speed to a value lower than the current input rotational speed, and then sets the target input rotational speed such that the input rotational speed changes according to the increase gradient corresponding to the current accelerator operation amount and the current vehicle speed range. Accordingly, in the case of changing the speed ratio of the continuously variable transmission to the upshift side, the input rotational speed can be reduced to change the speed ratio to the upshift side in a stepped manner. If the accelerator operation amount is approximately constant and the current vehicle speed range is the same, the input rotational speed can be increased according to the fixed increase gradient corresponding to the current accelerator operation amount and the current vehicle speed range. Even if the accelerator operation amount or the current vehicle speed range (vehicle speed) changes after the speed ratio starts being changed to the upshift side in a stepped manner, the increase gradient can be changed so as to correspond to the current accelerator operation amount and the current vehicle speed range, and the input rotational speed can be increased according to the resultant increase gradient. Accordingly, this control device gives the driver of the vehicle equipped with the continuously variable transmission a feeling that (direct) acceleration that matches his/her intention to accelerate has been achieved, after the speed ratio is changed to the upshift side in a stepped manner. The driver can thus be provided with a more direct feel of acceleration, i.e., a more direct driving feel. A better feel of acceleration and improved drivability of the vehicle equipped with the continuously variable transmission can thus be achieved.

BRIEF DESCRIPTION OF THE DRAWINGS

FIGS. 5A, 5B, and 5C are time charts showing an example of how the values of a target input rotational speed, a current vehicle speed range, and a first-speed flag change when a stepped upshift is performed.

FIGS. 7A and 7B are time charts showing another example of how the values of the target input rotational speed and the current vehicle speed range change when a stepped upshift is performed.

DETAILED DESCRIPTION OF EMBODIMENTS

A mode for carrying out the present disclosure will be described below with reference to the accompanying drawings.

Figure 1:
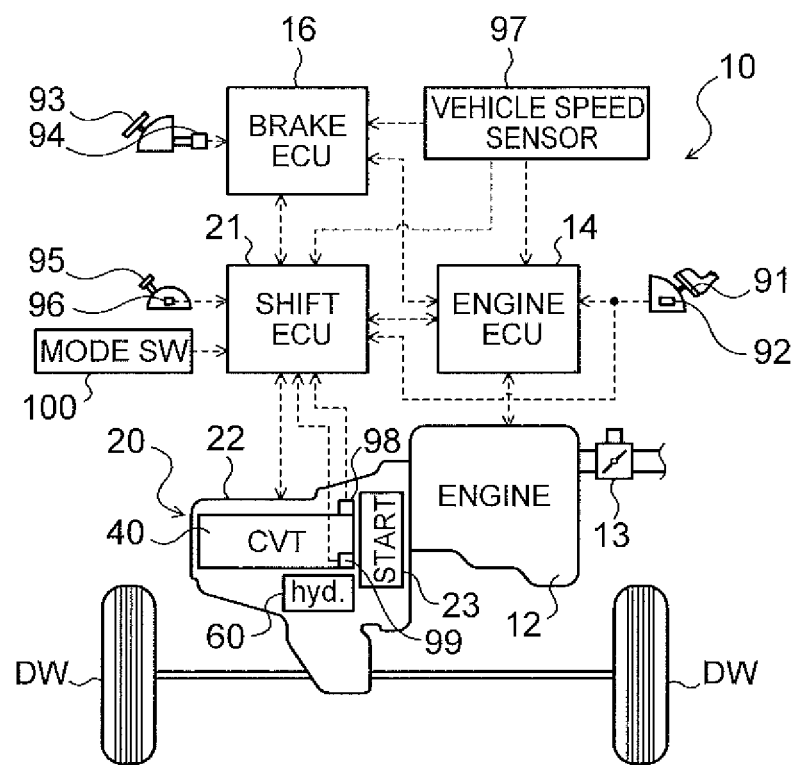
FIG. 1 is a schematic configuration diagram of a vehicle equipped with a power transmission device including a control device for a continuously variable transmission according to the present disclosure.

FIG. 1 is a schematic configuration diagram of an automobile 10 equipped with a power transmission device 20 including a control device for a continuously variable transmission according to the present disclosure. The automobile 10 shown in the figure includes, in addition to the power transmission device 20, an engine (internal combustion engine) 12 as a motor that outputs power by explosive combustion of a mixture of hydrocarbon fuel such as gasoline or light oil and air, an engine electronic control unit (hereinafter referred to as the "engine ECU") 14 that controls the engine 12, a brake electronic control unit (hereinafter referred to as the "brake ECU") 16 that controls an electronically controlled hydraulic brake unit, not shown, etc.

The engine ECU 14 is configured as a microcomputer having a CPU, not shown, as a core component and includes, in addition to the CPU, a ROM that stores various programs, a RAM that temporarily stores data, input/output ports and a communication port (both not shown), etc. As shown in FIG. 1, an accelerator operation amount (accelerator depression amount) from an accelerator pedal position sensor 92 that detects the amount by which an accelerator pedal 91 is depressed (the amount by which the accelerator pedal 91 is operated), a vehicle speed from a vehicle speed sensor 97, signals from various sensors etc. such as a crankshaft position sensor, not shown, that detects the rotational position of a crankshaft, signals from other electronic control units such as the brake ECU 16, etc. are input to the engine ECU 14. The engine ECU 14 controls an electronically controlled throttle valve 13, a fuel injection valve and an ignition plug, not shown, etc. based on these signals.

The brake ECU 16 is also configured as a microcomputer having a CPU, not shown, as a core component and includes, in addition to the CPU, a ROM that stores various programs, a RAM that temporarily stores data, input/output ports and a communication port (both not shown), etc. As shown in FIG. 1, a master cylinder pressure that is detected by a master cylinder pressure sensor 94 when a brake pedal 93 is depressed, a vehicle speed from the vehicle speed sensor 97, signals from various sensors, not shown, signals from other electronic control units such as the engine ECU 14, etc. are input to the brake ECU 16. The brake ECU 16 controls a brake actuator (hydraulic actuator), not shown, etc. based on these signals.

Figure 2:
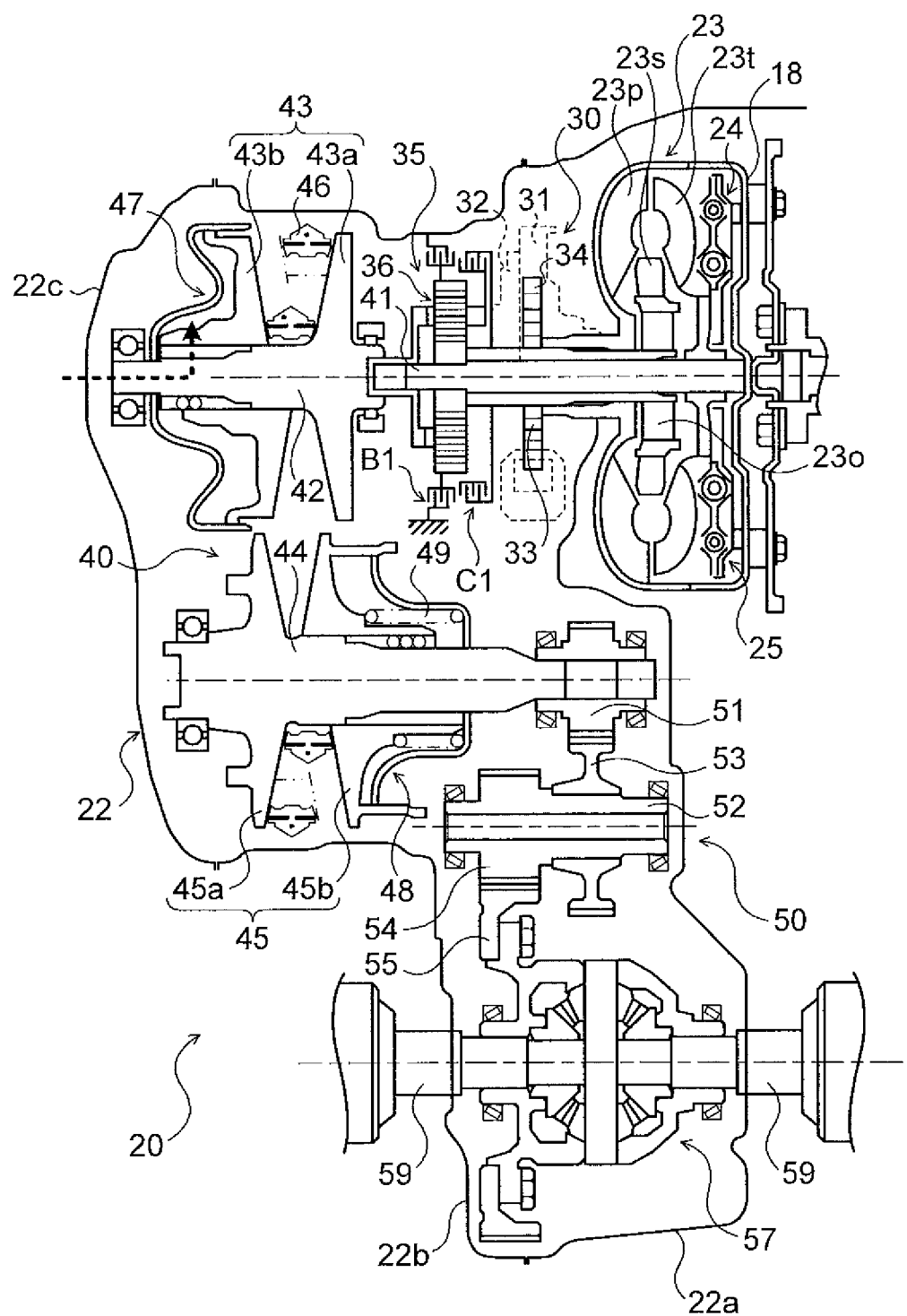
FIG. 2 is a schematic configuration diagram of the power transmission device shown in FIG. 1.

FIG. 2 is a schematic configuration diagram of the power transmission device 20 mounted on the automobile 10 of the present embodiment. The power transmission device 20 shown in the figure is configured as a transaxle that is connected transversely such that the crankshaft is substantially parallel to right and left drive shafts 59 connected to drive wheels DW. As shown in the figure, the power transmission device 20 includes: a transmission case 22 comprised of a converter housing 22a, a transaxle case 22b, and a rear cover 22c which are joined together; a starting device 23, an oil pump 30, a forward/backward travel switch mechanism 35, a belt-type continuously variable transmission (hereinafter referred to as the "CVT" as desired) 40, a gear mechanism 50, a differential gear (differential mechanism) 57, and a hydraulic control device 60 (see FIG. 1), which are accommodated in the transmission case 22; a shift electronic control unit (hereinafter referred to as the "shift ECU") 21 as a control device that controls the starting device 23 and the CVT 40, etc.

The starting device 23 is configured as a hydraulic starting device with a lockup clutch and is accommodated in the converter housing 22a. As shown in FIG. 2, the starting device 23 includes a pump impeller 23p that is connected to the crankshaft of the engine 12 via a front cover 18 as an input member, a turbine runner 23t that is fixed to an input shaft 41 of the CVT 40, a stator 23s that is placed inside the pump impeller 23p and the turbine runner 23t to adjust the flow of hydraulic fluid (ATF) from the turbine runner 23t to the pump impeller 23p, a one-way clutch 23o that allows the stator 23s to rotate only in one direction, a damper mechanism 24, a lockup clutch 25, etc.

The pump impeller 23p, the turbine runner 23t, and the stator 23s function as a torque converter due to the function of the stator 23s when the difference in rotational speed between the pump impeller 23p and the turbine runner 23t is large, and function as a fluid coupling when the difference in rotational speed therebetween is small. In the starting device 23, the stator 23s and the one-way clutch 23o may be omitted, and the pump impeller 23p and the turbine runner 23t function only as a fluid coupling. The damper mechanism 24 includes, e.g., an input element that is coupled to the lockup clutch 25, an intermediate element that is coupled to the input element via a plurality of first elastic bodies, an output element that is coupled to the intermediate element via a plurality of second elastic bodies and fixed to a turbine hub, etc. The lockup clutch 25 selectively performs a lockup operation of mechanically (via the damper mechanism 24) coupling the pump impeller 23p and the turbine runner 23t, namely mechanically coupling the front cover 18 and the input shaft 41 of the CVT 40, and releases the lockup. The lockup clutch 25 may be configured as a hydraulic single-plate friction clutch or may be configured as a hydraulic multi-plate friction clutch.

The oil pump 30 is configured as what is called a gear pump that includes a pump assembly formed by a pump body 31 and a pump cover 32 which are disposed between the starting device 23 and the forward/backward travel switch mechanism 35, an inner rotor (external gear) 33, an outer rotor (internal gear) 34, etc. The pump body 31 and the pump cover 32 are fixed to the converter housing 22a and the transaxle case 22b. The inner rotor 33 is coupled to the pump impeller 23p via a hub. Accordingly, as the inner rotor 33 is rotated by power from the engine 12, the oil pump 30 sucks hydraulic fluid (ATF) in an oil pan (hydraulic fluid reservoir portion), not shown, through a strainer (not shown) and supplies (discharges) hydraulic oil with an increased oil pressure to the hydraulic control device 60.

The forward/backward travel switch mechanism 35 is accommodated in the transaxle case 22b and has a double-pinion type planetary gear mechanism 36, and a brake B1 and a clutch C1 as hydraulic friction engagement elements. The planetary gear mechanism 36 has a sun gear that is fixed to the input shaft 41 of the CVT 40, a ring gear, and a carrier that supports a pinion gear meshing with the sun gear and a pinion gear meshing with the ring gear and that is coupled to a primary shaft 42 of the CVT 40. The brake B1 disengages the ring gear of the planetary gear mechanism 36 from the transaxle case 22b so as to allow the ring gear to rotate, and when the brake B1 is supplied with an oil pressure from the hydraulic control device 60, holds the ring gear of the planetary gear mechanism 36 stationary to the transaxle case 22b so as not to allow the ring gear to rotate. The clutch C1 disengages the carrier of the planetary gear mechanism 36 from the input shaft 41 (sun gear) so as to allow the carrier to rotate, and when an oil pressure is supplied from the hydraulic control device 60 to the clutch C1, couples the carrier of the planetary gear mechanism 36 to the input shaft 41. Accordingly, when the brake B1 is disengaged and the clutch C1 is engaged, power transmitted to the input shaft 41 can be transmitted as it is to the primary shaft 42 of the CVT 40 to move the automobile 10 forward. When the brake B1 is engaged and the clutch C1 is disengaged, rotation of the input shaft 41 is converted to rotation in the opposite direction, which can be transmitted to the primary shaft 42 of the CVT 40 to move the automobile 10 backward. When the brake B1 and the clutch C1 are disengaged, the input shaft 41 can be disconnected from the primary shaft 42.

The CVT 40 has a primary pulley 43 provided on the primary shaft 42 as a driving rotary shaft, a secondary pulley 45 provided on a secondary shaft 44 as a driven rotary shaft placed parallel to the primary shaft 42, a belt 46 placed in a groove of the primary pulley 43 and a groove of the secondary pulley 45, a primary cylinder 47 as a hydraulic actuator that changes the groove width of the primary pulley 43, and a secondary cylinder 48 as a hydraulic actuator that changes the groove width of the secondary pulley 45. The primary pulley 43 is formed by a fixed sheave 43a formed integrally with the primary shaft 42 and a movable sheave 43b that is supported by the primary shaft 42 via a ball spline such that the movable sheave 43b is slidable in the axial direction. The secondary pulley 45 is formed by a fixed sheave 45a formed integrally with the secondary shaft 44 and a movable sheave 45b that is supported by the secondary shaft 44 via a ball spline such that the movable sheave 45b is slidable in the axial direction and that is biased in the axial direction by a return spring 49 as a compression spring.

The primary cylinder 47 is formed on the back side of the movable sheave 43b of the primary pulley 43, and the secondary cylinder 48 is formed on the back side of the movable sheave 45b of the secondary pulley 45. Hydraulic oil is supplied from the hydraulic control device 60 to the primary cylinder 47 and the secondary cylinder 48 in order to change the groove widths of the primary pulley 43 and the secondary pulley 45. Power transmitted from the engine 12 to the primary shaft 42 via the starting device 23 and the forward/backward travel switch mechanism 35 can thus be steplessly shifted and output to the secondary shaft 44. The power thus output to the secondary shaft 44 is transmitted to the right and left drive wheels DW via the gear mechanism 50, the differential gear 57, and the drive shafts.

The gear mechanism 50 has a counter drive gear 51 that is rotatably supported by the transaxle case 22b via a bearing, a counter shaft 52 that extends parallel to the secondary shaft 44 and the drive shaft 59 and that is rotatably supported by the transaxle case 22b via a bearing, a counter driven gear 53 that is fixed to the counter shaft 52 and that meshes with the counter drive gear 51, a drive pinion gear (final drive gear) 54 formed in (or fixed to) the counter shaft 52, and a differential ring gear (final driven gear) 55 that meshes with the drive pinion gear 54 and that is coupled to the differential gear 57.

The hydraulic control device 60 is connected to the above oil pump 30 that is driven by power from the engine 12 to suck hydraulic oil from the oil pan through the strainer and discharge the hydraulic oil. The hydraulic control device 60 regulates the oil pressure from the oil pump 30 to generate an oil pressure required by the starting device 23, the forward/backward travel switch mechanism 35, the CVT 40, etc. and to supply hydraulic oil as a lubricating medium to parts to be lubricated, such as predetermined portions of the CVT 40, the one-way clutch 23o, the forward/backward travel switch mechanism 35, etc., and various bearings. Accordingly, the hydraulic control device 60 has a primary regulator valve that regulates the pressure of hydraulic oil from the oil pump 30 to generate a line pressure PL as a source pressure of an oil pressure to be supplied to the primary cylinder 47, the secondary cylinder 48, etc., a modulator valve that reduces the line pressure PL to generate a certain modulator pressure Pmod, a pressure regulating valve (linear solenoid valve) that regulates the modulator pressure Pmod from the modulator valve to generate an oil pressure to be supplied to the brake B1 or the clutch C1, and a manual valve that operates with a shift lever 95 (see FIG. 1) to supply hydraulic oil from the pressure regulating valve to one of the brake B1 and the clutch C1 or cut off supply of the hydraulic oil to the brake B1 and the clutch C1, according to the shift position.

The hydraulic control device 60 further has a first linear solenoid valve, a second linear solenoid valve, a primary pulley pressure control valve, and a secondary pulley pressure control valve in order to generate an oil pressure required for shifting of the CVT 40. The first linear solenoid valve regulates, e.g., the modulator pressure Pmod to generate a primary solenoid pressure Pslp as a signal pressure, and the second linear solenoid valve regulates, e.g., the modulator pressure Pmod to generate a secondary solenoid pressure Psls as a signal pressure. The primary pulley pressure control valve regulates the line pressure PL by using the primary solenoid pressure Pslp from the first linear solenoid valve as a signal pressure to generate a primary pulley pressure (primary sheave pressure) Pp for the primary pulley 43, i.e., the primary cylinder 47. The secondary pulley pressure control valve regulates the line pressure PL by using the secondary solenoid pressure Psls from the second linear solenoid valve as a signal pressure to generate a secondary pulley pressure (secondary sheave pressure) Ps for the secondary pulley 45, i.e., the secondary cylinder 48.

The shift ECU 21 that controls such a power transmission device 20 is also configured as a microcomputer having a CPU, not shown, as a core component and includes, in addition to the CPU, a ROM that stores various programs, a RAM that temporarily stores data, input/output ports and a communication port (both not shown), etc. As shown in FIG. 1, signals from various sensors etc. such as an accelerator operation amount from the accelerator pedal position sensor 92, a vehicle speed from the vehicle speed sensor 97, and a shift position from a shift position sensor 96 that detects an operation position of the shift lever 95 for selecting a desired shift position from a plurality of shift positions, and signals from the engine ECU 14 and the brake ECU 16 are input to the shift ECU 21.

As shown in FIG. 1, signals from an input rotational speed sensor 98 that detects an input rotational speed Nin of the CVT 40 (rotational speed of the input shaft 41 or the primary shaft 42), an output rotational speed sensor 99 that detects an output rotational speed Nout of the CVT 40 (rotational speed of the secondary shaft 44), and an oil temperature sensor, not shown, that detects a temperature Toil of hydraulic oil of hydraulic control device 60 are input to the shift ECU 21. The shift ECU 21 controls the starting device 23 and the CVT 40, namely the pressure regulating valve, the first and second linear solenoid valves, etc. of the hydraulic control device 60, based on such input signals. In order to control these valves, the shift ECU 21 controls a drive circuit, not shown, such that a current corresponding to an oil pressure command value is applied from an auxiliary battery, not shown, to a solenoid part of each valve.

A mode select switch 100 that allows the driver of the automobile 10 to select a desired control mode from a plurality of control modes of the CVT 40 is also connected to the shift ECU 21. In the present embodiment, the mode select switch 100 allows the driver to select between a normal mode (stepless shift mode) in which the speed ratio $\gamma$ of the CVT 40 is changed steples sly and a sport mode (stepped shift mode) in which the speed ratio $\gamma$ is changed in a stepped manner. If the normal mode (stepless shift mode) is selected by the driver via the mode select switch 100, the shift ECU 21 sets a mode flag Fm to a value of 0 and stores the set value in the RAM, not shown. If the sport mode (stepped shift mode) is selected by the driver via the mode select switch 100, the shift ECU 21 sets the mode flag Fm to a value of 1 and stores the set value in the RAM.

Figure 3:
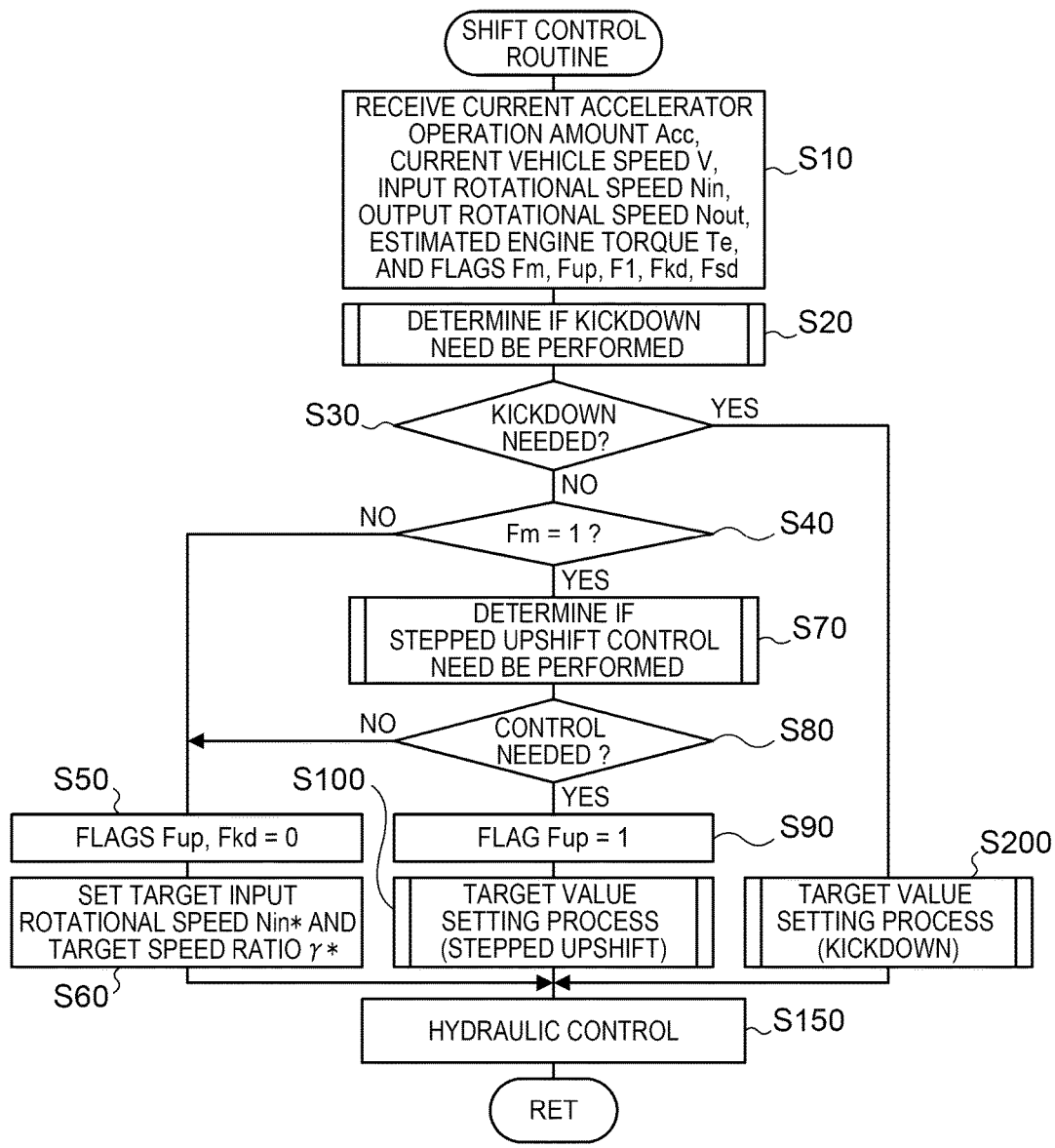
FIG. 3 is a flowchart showing an example of a shift control routine that is executed by the control device for the continuously variable transmission according to the present disclosure.

Next, shift control of the CVT 40 will be described below. FIG. 3 is a flowchart showing an example of a shift control routine that is repeatedly executed by the shift ECU 21 at predetermined time intervals dt (e.g., every several milliseconds) when the accelerator pedal 91 is being depressed by the driver of the automobile 10.

When starting the shift control routine of FIG. 3, the shift ECU 21 receive data required for control, such as a current accelerator operation amount Acc that is transmitted from the accelerator pedal position sensor 92, a current vehicle speed V that is transmitted from the vehicle speed sensor 97, an input rotational speed Nin that is transmitted from the input rotational speed sensor 98, an output rotational speed Nout that is transmitted from the output rotational speed sensor 99, estimated engine torque Te that is transmitted from the engine ECU 14, values of the mode flag Fm, a stepped upshift execution flag Fup, a first-speed flag F1, a kickdown flag Fkd, and a stepdown flag Fsd (step S10). The shift ECU 21 then determines whether or not kickdown in which the speed ratio $\gamma$ of the CVT 40 is changed according to driver's kickdown operation in a manner similar to that in a stepped automatic transmission, need be performed (whether or not conditions for performing kickdown are satisfied), based on the current accelerator operation amount Acc, the current vehicle speed V, and the value of the kickdown flag Fkd received in step S10 (step S20).

In step S20, the shift ECU 21 determines whether or not the current vehicle speed V received in step S10 is equal to or higher than a predetermined threshold Vkd, whether or not the current accelerator operation amount Acc received in step S10 is equal to or larger than a predetermined threshold Akd, whether or not a variation $\Delta$Acc in accelerator operation amount in each execution interval of this routine (=Acc the previous Acc) is equal to or larger than a predetermined threshold $\Delta$Akd, and whether or not the kickdown flag Fkd has a value of 1 or not. If the current vehicle speed V is equal to or higher than the threshold Vkd, the current accelerator operation amount Acc is equal to or larger than the threshold Akd, and the variation $\Delta$Acc in accelerator operation amount is equal to or larger than the threshold $\Delta$Akd, and if the kickdown flag Fkd has a value of 1 or not, the shift ECU 21 determines that kickdown need be performed (step S30). If these conditions are not satisfied, the shift ECU 21 determines in step S30 that kickdown need not be performed. In a vehicle having what is called a kickdown switch, the shift ECU 21 may determine in step S20 whether kickdown need be performed or not based on the operating state of the kickdown switch. If the shift ECU 21 determines in step S30 that kickdown need not be performed, it determines whether or not the mode flag Fm has a value of 1, namely whether or not the sport mode has been selected by the driver as a control mode of the CVT 40 (step S40).

If the shift ECU 21 determines in step S40 that the mode flag Fm has a value of 0 and the normal mode has been selected by the driver as a control mode of the CVT 40, it sets the stepped upshift execution flag Fup and the kickdown flag Fkd to a value of 0 (step S50). Subsequently, the shift ECU 21 sets a target input rotational speed Nin*, or a target value of the input rotational speed Nin of the CVT 40 (rotational speed Ne of the engine 12), by using a normal mode shift map (shift map for stepless shift control), not shown, and sets a target speed ratio $\gamma$*(=Nin*/Nout) of the CVT 40 based on the set target input rotational speed Nin* and the output rotational speed Nout received in step S10 (step S60).

The normal mode shift map used in step S60 is created in advance so as to determine, for each accelerator operation amount, a target input rotational speed Nin* corresponding to the current vehicle speed V which is used when the speed ratio $\gamma$ of the CVT 40 is changed steplessly so as to improve fuel economy of the automobile 10. The normal mode shift map is stored in the ROM, not shown, of the shift ECU 21. In step S60, the shift ECU 21 performs a linear interpolation as needed and derives and sets a target input rotational speed Nin* corresponding to the current accelerator operation amount Acc and the current vehicle speed V received in step S10, based on the normal mode shift map, and sets a target speed ratio $\gamma$* of the CVT 40 by dividing the set target input rotational speed Nin* by the output rotational speed Nout.

After the process of step S60, the shift ECU 21 controls the first linear solenoid valve based on the difference between the input rotational speed Nin and the target input rotational speed Nin* received in step S10 etc. such that the primary pulley pressure Pp from the primary pulley pressure control valve of the hydraulic control device 60 has a value corresponding to the target speed ratio γ* (step S150). In step S150, the shift ECU 21 controls the second linear solenoid valve based on the estimated engine torque Te etc. such that slipping of the belt 46 of the CVT 40 is restrained by the secondary pulley pressure Ps from the secondary pulley pressure control valve. The shift ECU 21 repeats the processes of step S10 and the subsequent steps as long as the accelerator pedal 91 is depressed.

If the shift ECU 21 determines in step S40 that the mode flag Fm has a value of 1 and that the sport mode has been selected by the driver as a control mode of the CVT 40, it determines whether or not a stepped upshift, or a shift in which the speed ratio γ of the CVT 40 is changed to the upshift side (to a lower speed ratio) in a stepped manner according to driver's accelerator operation as in a stepped automatic transmission, need be performed (whether or not conditions for performing a stepped upshift are satisfied) (step S70). In step S70, the shift ECU 21 determines whether or not the current accelerator operation amount Acc is equal to or larger than a predetermined start threshold As (e.g., about 25%), whether or not the variation ΔAcc in accelerator operation amount has been maintained at a value of 0 (or a value close to 0) for a determination time (e.g., several tens of milliseconds), and if the stepped upshift execution flag Fup has a value of 1, whether or not the current accelerator operation amount Acc is smaller than a predetermined cancel threshold Ae (e.g., about 20%). If the current accelerator operation amount Acc is equal to or larger than the start threshold As and the variation ΔAcc has not been maintained at a value of 0 (or a value close to 0) for the determination time, and if the stepped upshift execution flag Fup has a value of 1 and the current accelerator operation amount Acc is equal to or larger than the cancel threshold Ae, the shift ECU 21 determines that a stepped upshift need be performed (step S80). If these conditions are not satisfied, the shift ECU 21 determines in step S80 that a stepped upshift need not be performed.

If the shift ECU 21 determines in step S80 that a stepped upshift need not be performed, it performs the above processes of steps S50, S60 and then performs hydraulic control based on the target input rotational speed Nin* and the target speed ratio γ* set in step S60 (step S150). The shift ECU 21 repeats the processes of step S10 and the subsequent steps as long as the accelerator pedal 91 is depressed. If the shift ECU 21 determines in step S80 that a stepped upshift need be performed, it sets the stepped upshift flag Fup to a value of 1 (step S90) and performs a target value setting process of step S100 to set a target input rotational speed Nin* and a target speed ratio γ*. The shift ECU 21 further performs hydraulic control based on the target input rotational speed Nin* and the target speed ratio γ* set in step S100 (step S150). The shift ECU 21 repeats the processes of step S10 and the subsequent steps as long as the accelerator pedal 91 is depressed. If the shift ECU 21 determines in step S30 that kickdown need be performed, it performs a target value setting process of step S200 to set a target input rotational speed Nin* and a target speed ratio γ*, and performs hydraulic control based on the target input rotational speed Nin* and the target speed ratio γ* set in step S200 (step S150). In this case as well, the shift ECU 21 repeats the processes of step S10 and the subsequent steps as long as the accelerator pedal 91 is depressed.

Figure 4:
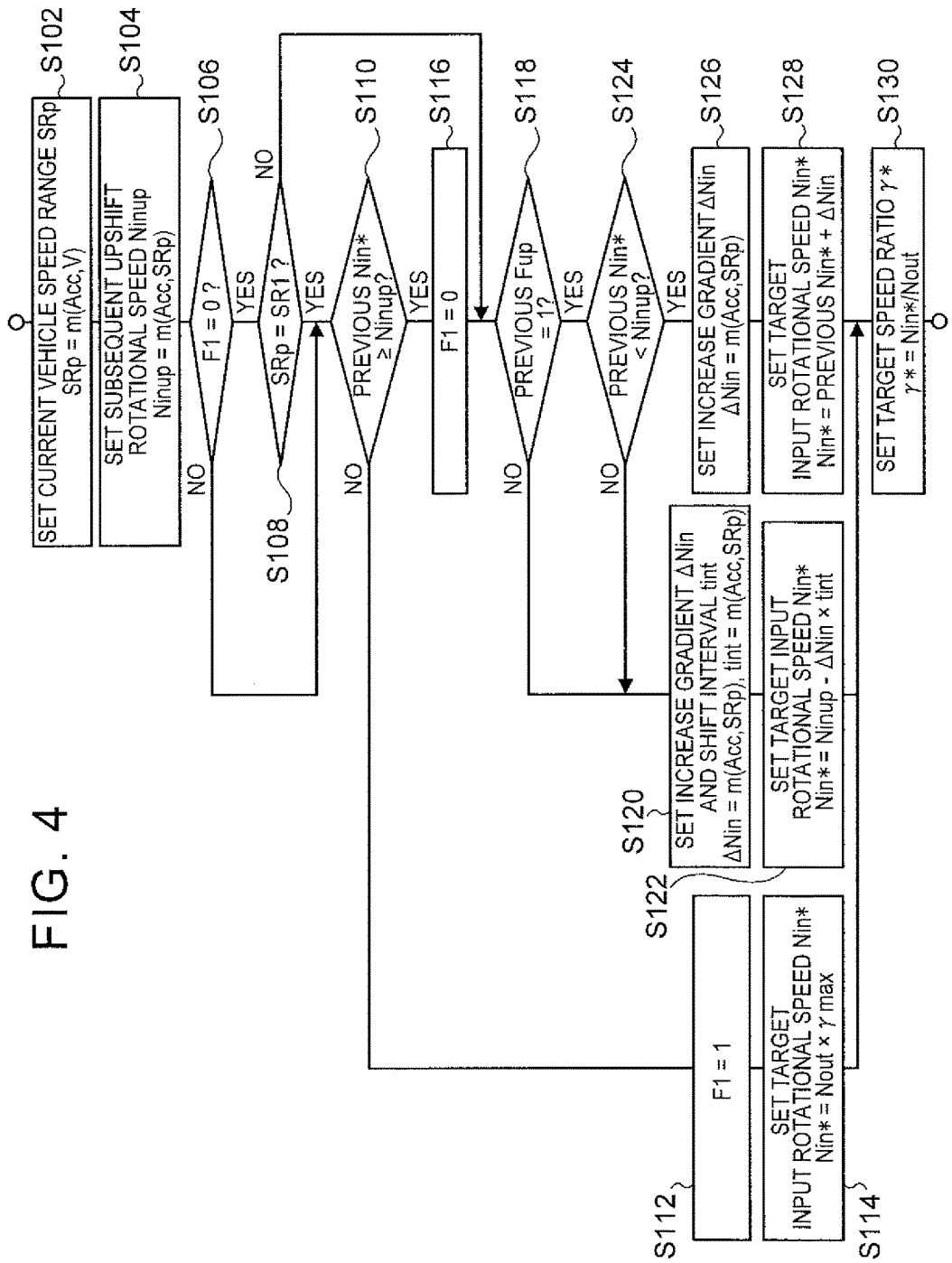
FIG. 4 is a flowchart showing an example of a target value setting process that is used when a stepped upshift is performed.
Figure 6A:
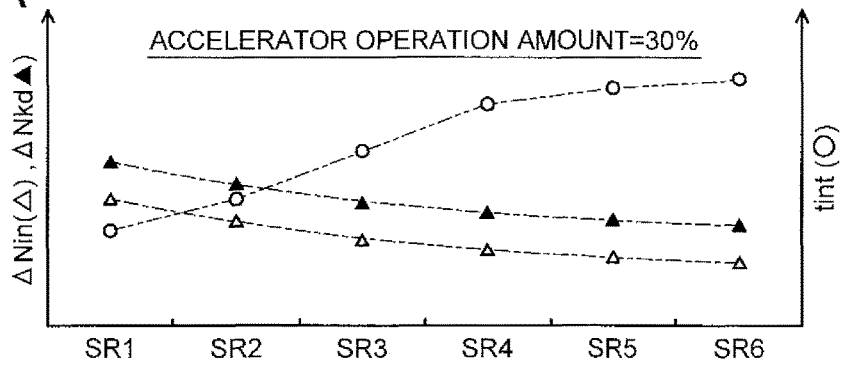
FIGS. 6A, 6B, 6C, and 6D are illustrations showing an increase gradient setting map, a kickdown gradient setting map, and a shift interval setting map.
Figure 6B:
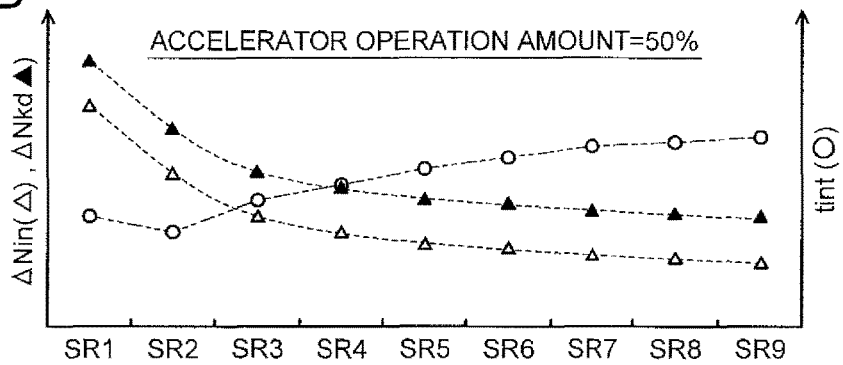
Figure 6C:
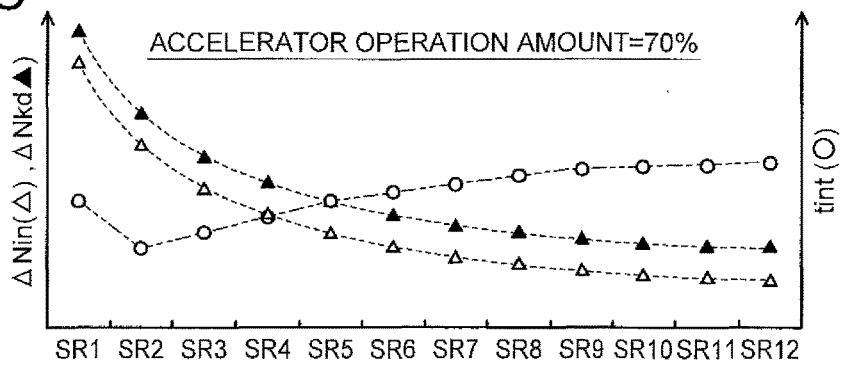
Figure 6D:
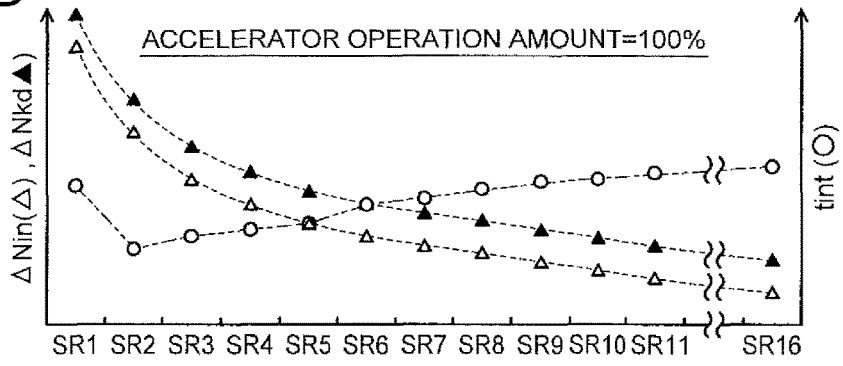

FIG. 4 is a flowchart showing an example of the target value setting process in step S100 of FIG. 3. As shown in the figure, when the shift ECU 21 determines in step S80 that a stepped upshift need be performed, it sets a current vehicle speed range SRp to a vehicle speed range SR corresponding to the current accelerator operation amount Acc and the current vehicle speed V received in step S10 (step S102). A plurality of vehicle speed ranges SR are determined for each accelerator operation amount by dividing a possible vehicle speed range for each accelerator operation amount (range from the vehicle speed of zero to the highest possible vehicle speed for the accelerator operation amount) into a plurality of ranges. In the present embodiment, a vehicle speed range setting map, not shown, that defines a plurality of vehicle speed ranges SR for each accelerator operation amount (e.g., for each of the accelerator operation amounts of 100%, 70%, 50%, and 30%) is created in advance and stored in the ROM, not shown, of the shift ECU 21. In step S102, the shift ECU 21 performs a linear interpolation as needed and sets (obtains), as a current vehicle speed range SRp, a vehicle speed range SR including the current vehicle speed V from the plurality of vehicle speed ranges SR corresponding to the current accelerator operation amount Acc received in step S10, based on the vehicle speed range setting map.

In the vehicle speed range setting map of the present embodiment, the number of vehicle speed ranges SR for each accelerator operation amount is determined so as to increase as the accelerator operation amount increases. That is, the vehicle speed range setting map that is used in step S102 is intended for continuously variable transmissions that are mounted on widely used vehicles equipped with about 1.5 L to 3.0 L engines, and is created as follows in view of performance of such vehicles (maximum vehicle speed Vmax, acceleration performance, etc.), characteristics of the engines, etc. The number of vehicle speed ranges SR (the number of ranges into which the possible vehicle speed range is divided) for the maximum accelerator operation amount (100%) is, e.g., "16" (16 steps from SR1 to SR16), the number of vehicle speed ranges SR for the accelerator operation amount of 70% is, e.g., "12" (12 steps from SR1 to SR12), the number of vehicle speed ranges SR for the accelerator operation amount of 50% is, e.g., "9" (9 steps from SR1 to SR9), and the number of vehicle speed ranges SR for the accelerator operation amount of 30% is, e.g., "6" (6 steps from SR1 to SR6).

After setting the current vehicle speed range SRp corresponding to the current accelerator operation amount Acc and the current vehicle speed V, the shift ECU 21 sets a subsequent upshift rotational speed Ninup, i.e., a target value of the input rotational speed Nin which is used the next time the speed ratio γ of the CVT 40 is changed to the upshift side in a stepped manner, based on the current accelerator operation amount Acc received in step S10 and the current vehicle speed range SRp set in step S102 (step S104). In the present embodiment, a subsequent upshift rotational speed setting map, not shown, that defines subsequent upshift rotational speeds Ninup in the plurality of vehicle speed ranges SR for each accelerator operation amount (e.g., for each of the accelerator operation amounts of 100%, 70%, 50%, and 30%) is created in advance and stored in the ROM, not shown, of the shift ECU 21. The subsequent upshift rotational speed setting map is a map that assigns subsequent upshift rotational speeds Ninup (fixed values) determined in view of expected speed ratios, vehicle speeds, etc. in the vehicle speed ranges SR to the vehicle speed ranges SR for each accelerator operation amount. In the present embodiment, the subsequent upshift rotational speed setting map is created so as to define the subsequent upshift rotational speed Ninup in view of torque characteristics of the engine etc. such that the subsequent upshift rotational speed Ninup increases as the accelerator operation amount increases. In step S104, the shift ECU 21 performs a linear interpolation as needed and derives and sets a subsequent upshift rotational speed Ninup corresponding to the current accelerator operation amount Acc and the current vehicle speed range SRp, based on the subsequent upshift rotational speed setting map.

Thereafter, the shift ECU 21 determines whether or not the first-speed flag F1 has a value of 0 (step S106). The first-speed flag F1 is set to a value of 0 in the case where a stepped upshift or kickdown is not performed or in the case where the current vehicle speed range SRp is a vehicle speed range other than the lowest vehicle speed range SR1. Accordingly, when a stepped upshift is started, the shift ECU 21 makes a Yes determination (determines that F1=0) in step S106. If the shift ECU 21 determines in step S106 that the first-speed flag F1 has a value of 0, it determines whether or not the current vehicle speed range SRp is the lowest vehicle speed range SR1 (regardless of the current accelerator operation amount Acc) (step S108). If the shift ECU 21 determines that the current vehicle speed range SRp is the lowest vehicle speed range SR1, it determines whether or not the target input rotational speed Nin* (previous value) set in the previous execution of this routine is equal to or higher than the subsequent upshift rotational speed Ninup set in step S104 (whether or not the target input rotational speed Nin* has reached the subsequent upshift rotational speed Ninup) (step S110). If the shift ECU 21 determines that the previous value of the target input rotational speed Nin* is lower than the subsequent upshift rotational speed Ninup, it sets the first-speed flag F1 to a value of 1 in step S112 (step S112) and then sets a target input rotational speed Nin* for this time to the product of the output rotational speed Nout received in step S10 and the maximum speed ratio γmax of the CVT 40 (step S114). The shift ECU 21 further sets a target speed ratio γ* of the CVT 40 by dividing the set target input rotational speed Nin* by the output rotational speed Nout received in step S10 (step S130) and then performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S114 and then performs the target value setting process of step S100, it sets the current vehicle speed range SRp and the subsequent upshift rotational speed Ninup corresponding to the current accelerator operation amount Acc and the current vehicle speed V (steps S102, S104) in a manner described above and performs the determination process of step S106. As described above, in the case where the shift ECU 21 sets the target input rotational speed Nin* in step S114, it sets the first-speed flag F1 to a value of 1 in step S112. Accordingly, in this case, the shift ECU 21 determines in step S106 that the first-speed flag F1 has a value of 1. The shift ECU 21 thus skips the process of step S108 and determines whether or not the previous value of the target input rotational speed Nin* is equal to or higher than the subsequent upshift rotational speed Ninup (step S110). If the shift ECU 21 determines that the previous value of the target input rotational speed Nin* is lower than the subsequent upshift rotational speed Ninup, it sets in step S114 the target input rotational speed Nin* of the CVT 40 from the maximum speed ratio γmax of the CVT 40 and the output rotational speed Nout in a manner described above.

As a result, in the case where the automobile 10 is started with the sport mode being selected by the driver, or in the case where the sport mode is selected by the driver with the current vehicle speed V being included in the lowest vehicle speed range SR1, as shown in FIG. 5, the shift ECU 21 sets the target input rotational speed Nin* of the CVT 40 based on the maximum speed ratio γmax and the output rotational speed Nout from when the vehicle is started or from immediately after the sport mode is selected (time t0 in FIG. 5) until the shift ECU 21 determines in step S110 that the previous value of the target input rotational speed Nin* has become equal to or higher than (has reached) the subsequent upshift rotational speed Ninup (time t1 in FIG. 5) (step S114). As described above, in the case where the current vehicle speed range SRp is the lowest vehicle speed range SR1, the shift ECU 21 sets the target input rotational speed Nin* by using a fixed speed ratio, namely the maximum speed ratio γmax, until the target input rotational speed Nin* reaches the subsequent upshift rotational speed Ninup. This can ensure satisfactory acceleration performance of the automobile 10 in the lowest vehicle speed range SR1.

In the case where the shift ECU 21 sets the target input rotational speed Nin* in step S114 and then determines in step S110 that the previous value of the target input rotational speed Nin* is equal to or higher than the subsequent upshift rotational speed Ninup, it sets the first-speed flag F1 to a value of 0 (step S116) and then determines, based on the value (previous value) of the stepped upshift execution flag Fup in the previous execution of this routine, whether or not it is when a stepped upshift is started (whether or not the current cycle is the first cycle after the shift ECU 21 has determined that a stepped upshift need be performed) (step S118). In the case where the shift ECU 21 performs the target value setting process of step S100, determines in step S106 that the first-speed flag F1 has a value of 0, and determines in step S108 that the current vehicle speed range SRp is not the lowest vehicle speed range SR1, it determines based on the previous value of the stepped upshift execution flag Fup whether or not it is when a stepped upshift is started (step S118).

In the case where the shift ECU 21 determines in step S118 that the previous value of the stepped upshift execution flag Fup has a value of 0 and that it is when a stepped upshift is started, it sets an increase gradient ΔNin based on the current accelerator operation amount Acc received in step S10 and the current vehicle speed range SRp set in step S102 and sets a shift interval tint based on the current accelerator operation amount Acc and the current vehicle speed range SRp (step S120). The increase gradient ΔNin defines a variation (positive value) in the input rotational speed Nin in each execution interval of this routine (time interval dt) after the speed ratio γ of the CVT 40 starts being changed to the upshift side (to a lower speed ratio) in a stepped manner. The shift interval tint defines an approximate time interval from when the speed ratio γ of the CVT 40 starts being changed to the upshift side in a stepped manner until the next time the speed ratio γ is changed to the upshift side in a stepped manner.

In the present embodiment, an increase gradient setting map is created in advance which defines increase gradients ΔNin in the plurality of vehicle speed ranges SR for each accelerator operation amount (e.g., for each of the accelerator operation amounts of 100%, 70%, 50%, and 30%), and a shift interval setting map is also created in advance which defines shift intervals tin in the plurality of vehicle speed ranges SR for each accelerator operation amount (e.g., for each of the accelerator operation amounts of 100%, 70%, 50%, and 30%). Both of the maps are stored in the ROM, not shown, of the shift ECU 21. The increase gradient setting map of the present embodiment is a map that assigns increase gradients ΔNin determined through experiments and analysis to the vehicle speed ranges SR for each accelerator operation amount. As shown in FIGS. 6A to 6D, the increase gradient setting map is created such that the increase gradient ΔNin increases as the accelerator operation amount increases, and decreases as the vehicle speed range SR is shifted to a higher vehicle speed range (see white triangles in FIG. 6). The shift interval setting map of the present embodiment is a map that assigns shift intervals tint determined through experiments and analysis to the vehicle speed ranges SR for each accelerator operation amount. As shown in FIGS. 6A to 6D, the shift interval setting map is created such that the shift interval tint decreases as the accelerator operation amount increases, and increases as the vehicle speed range SR is shifted to a higher vehicle speed range except for the case of the lowest vehicle speed range SR1.

In step S120, the shift ECU 21 performs a linear interpolation as needed and derives and sets an increase gradient ΔNin corresponding to the current accelerator operation amount Acc and the current vehicle speed range SRp, based on the increase gradient setting map, and performs a linear interpolation as needed and derives and sets a shift interval tint corresponding to the current accelerator operation amount Acc and the current vehicle speed range SRp, based on the shift interval setting map. Subsequently, the shift ECU 21 sets a target input rotational speed Nin* for this time to a value obtained by subtracting the product of the increase gradient ΔNin and the shift interval tint from the subsequent upshift rotational speed Ninup set in step S104 (step S122). Since the target input rotational speed Nin* is set based on the subsequent upshift rotational speed Ninup, the increase gradient ΔNin, and the shift interval tint in step S122, the target input rotational speed Nin* can be made lower than the input rotational speed Nin at that time (current input rotational speed). The shift ECU 21 sets a target speed ratio γ* of the CVT 40 by dividing the set target input rotational speed Nin* by the output rotational speed Nout received in step S10 (step S130) and then performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S122 and then performs the target value setting process of step S100, it sets the current vehicle speed range SRp and the subsequent upshift rotational speed Ninup corresponding to the current accelerator operation amount Acc and the current vehicle speed V in a manner described above (steps S102, S104) and performs the processes of step S106 and the subsequent steps. In this case, since it is not immediately after the start of a stepped upshift and the current vehicle speed range SRp is not the lowest vehicle speed range SR1, the shift ECU 21 performs the determination processes of steps S106, S108, S118 and then determines whether or not the previous value of the target input rotational speed Nin* is lower than the subsequent upshift rotational speed Ninup set in step S104 (whether or not the target input rotational speed Nin* has reached the subsequent upshift rotational speed Ninup) (step S124).

If the shift ECU 21 determines in step S124 that the previous value of the target input rotational speed Nin* is lower than the subsequent upshift rotational speed Ninup, it derives and sets, based on the above increase gradient setting map, an increase gradient ΔNin corresponding to the current accelerator operation amount Acc received in step S10 and the current vehicle speed range SRp set in step S102, in a manner similar to that of step S120 (step S126). Subsequently, the shift ECU 21 sets a target input rotational speed Nin* for this time to the sum of the previous value of the target input rotational speed Nin* and the increase gradient ΔNin set in step S126 (step S128) and sets a target speed ratio γ* of the CVT 40 by dividing the set target input rotational speed Nin* by the output rotational speed Nout received in step S10 (step S130). The shift ECU 21 further performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S128 and then performs the target value setting process of step S100, it performs the processes of steps S102, S104, S106, S108, S118 and then determines whether or not the previous value of the target input rotational speed Nin* is lower than the subsequent upshift rotational speed Ninup (step S124). If the shift ECU 21 determines in step S124 that the previous value of the target input rotational speed Nin* is lower than the subsequent upshift rotational speed Ninup, it sets an increase gradient ΔNin corresponding to the current accelerator operation amount Acc and the current vehicle speed range SRp (step S126) and sets a target input rotational speed Nin* for this time to the sum of the previous value of the target input rotational speed Nin* and the increase gradient ΔNin (step S128). In the case where the shift ECU 21 performs the processes of steps S102, S104, S106, S108, S118 and then determines in step S124 that the previous value of the target input rotational speed Nin* is equal to or higher than the subsequent upshift rotational speed Ninup set in step S104, it performs the above processes of step S120 and the subsequent steps. The shift ECU repeats the processes of step S10 and the subsequent steps as long as the accelerator pedal 91 is depressed.

Accordingly, as shown in FIG. 7, if the shift ECU 21 sets the target input rotational speed Nin* to a value obtained by subtracting the product of the increase gradient ΔNin and the shift interval tint from the subsequent upshift rotational speed Ninup in step S122 (time t10 in FIG. 7), it subsequently sets the target input rotational speed Nin* to the sum of the previous value of the target input rotational speed Nin* and the increase gradient ΔNin corresponding to the current accelerator operation amount Acc and the current vehicle speed range SRp at the time intervals dt in step S128 until it determines in step S124 that the previous value of the target input rotational speed Nin* has become equal to or higher than (has reached) the subsequent upshift rotational speed Ninup set in step S104 (time t11 in FIG. 7). As shown by a long dashed double-short dashed line in FIG. 7, the shift ECU 21 can thus relatively sharply reduce the input rotational speed Nin of the CVT 40 to change the speed ratio γ to the upshift side in a stepped manner and can increase the speed ratio γ according to the increase gradient ΔNin corresponding to the current accelerator operation amount Acc and the current vehicle speed range SRp.

As described above, when performing a stepped upshift, the shift ECU 21 as a control device for the CVT 40 obtains, at the predetermined time intervals dt, the current vehicle speed range SRp corresponding to the current accelerator operation amount Acc and the current vehicle speed V from the plurality of vehicle speed ranges SR determined for each accelerator operation amount by dividing a possible vehicle speed range for each accelerator operation amount into a plurality of ranges (vehicle speed range setting map), namely obtains, at the predetermined time intervals dt, a vehicle speed range SR including the current vehicle speed V from the plurality of vehicle speed ranges SR corresponding to the current accelerator operation amount Acc (step S102). The shift ECU 21 also sets, at the time intervals dt, a subsequent upshift rotational speed Ninup, i.e., a target value of the input rotational speed Nin which is used the next time the speed ratio γ is changed to the upshift side in a stepped manner, based on at least the current accelerator operation amount Acc (step S104). The shift ECU 21 further sets, at the timing the speed ratio γ is changed to the upshift side in a stepped manner, the target input rotational speed Nin* to a value lower than the input rotational speed Nin at that time (current input rotational speed) (step S122). After setting the target input rotational speed Nin* in step S122, the shift ECU 21 obtains, at the time intervals dt, an increase gradient ΔNin corresponding to the current accelerator operation amount Acc and the current vehicle speed range SRp from the increase gradients ΔNin of the input rotational speed Nin which are determined for the plurality of vehicle speed ranges SR for each accelerator operation amount (increase gradient setting map) (step S126), and sets, at the time intervals dt, the target input rotational speed Nin* such that the input rotational speed Nin changes according to the increase gradient ΔNin corresponding to the current accelerator operation amount Acc and the current vehicle speed range SRp until the target input rotational speed Nin* (previous value) reaches the subsequent up shift rotational speed Ninup (step S128).

Namely, the shift ECU 21 sets the target input rotational speed Nin* such that the input rotational speed Nin of the CVT 40 becomes lower than the current input rotational speed Nin, and then sets the target input rotational speed Nin* such that the input rotational speed Nin increases according to the increase gradient ΔNin corresponding to the current accelerator operation amount Acc and the current vehicle speed range SRp. Accordingly, in the case where the input rotational speed Nin is reduced, so that the speed ratio γ of the CVT 40 is changed to the upshift side in a stepped manner, and the accelerator operation amount by the driver is approximately constant and the current vehicle speed range SRp is the same, the input rotational speed Nin can be increased according to the fixed increase gradient ΔNin corresponding to the current accelerator operation amount Acc and the current vehicle speed range SRp. In this case, the speed ratio γ can therefore be changed to the upshift side in a stepped manner after the shift interval tint (time t11 in FIG. 7) from the timing the speed ratio γ starts being changed to the upshift side in a stepped manner (time t10 in FIG. 7). As shown by a dashed line in FIG. 7, even if the accelerator operation amount or the current vehicle speed range SRp (current vehicle speed V) changes after the speed ratio γ starts being changed to the upshift side in a stepped manner, the increase gradient ΔNin can be changed so as to correspond to the current accelerator operation amount Acc and the current vehicle speed range SRp, and the input rotational speed Nin can be increased according to the resultant increase gradient ΔNin.

This gives the driver a feeling that (direct) acceleration that matches his/her intention to accelerate has been achieved, after the speed ratio γ of the CVT 40 is changed to the upshift side in a stepped manner. The driver can thus be provided with a more direct feel of acceleration, i.e., a more direct driving feel. A better feel of acceleration and improved drivability of the automobile 10 equipped with the CVT 40 can thus be achieved. In the above embodiment, the target input rotational speed Nin* is set such that the input rotational speed Nin increases according to the increase gradient ΔNin corresponding to the current accelerator operation amount Acc and the current vehicle speed range SRp from the cycle subsequent to the cycle in which the target input rotational speed Nin* is set in step S122. However, the present disclosure is not limited to this. The target input rotational speed Nin* may be set such that the target input rotational speed Nin* is maintained at a low value after being set in step S122 and the input rotational speed Nin increases according to the increase gradient ΔNin once the input rotational speed Nin has decreased to a certain degree.

The shift ECU 21 obtains a shift interval tint corresponding to the current accelerator operation amount Acc and the current vehicle speed range SRp from the plurality of shift intervals tint determined for the plurality of vehicle speed ranges SR for each accelerator operation amount (shift interval setting map) as a time from the timing the speed ratio γ is changed to the upshift side in a stepped manner until the next time the speed ratio γ is changed to the upshift side in a stepped manner (step S120). The shift ECU 21 then sets, at the timing the speed ratio γ is changed to the up shift side in a stepped manner, a target input rotational speed Nin* based on the subsequent upshift rotational speed Ninup set in step S104 and the increase gradient ΔNin and the shift interval tint obtained in step S120 (step S122). Accordingly, at the timing the speed ratio γ is changed to the upshift side in a stepped manner, the input rotational speed Nin can be reduced by an amount corresponding to the increase gradient ΔNin that is used to subsequently increase the input rotational speed Nin. The subsequent timing the speed ratio γ is changed to the upshift side in a stepped manner can thus be made to be a more appropriate timing that matches driver's intention to accelerate.

Moreover, in the case where the current vehicle speed range SRp is the lowest vehicle speed range SR1, the shift ECU 21 sets the target input rotational speed Nin* based on the maximum speed ratio γmax as a predetermined fixed speed ratio and the output rotational speed Nout of the CVT 40 until the target input rotational speed Nin* (previous value) reaches the subsequent upshift rotational speed Ninup (step S114). In the case where the current vehicle speed range SRp is the lowest vehicle speed range SR1, the shift ECU 21 thus sets the target input rotational speed Nin* by using the maximum speed ratio max until the target input rotational speed Nin* reaches the subsequent upshift rotational speed Ninup. This can ensure satisfactory acceleration performance of the automobile 10 in the lowest vehicle speed range SR1.

The fixed speed ratio used in step S114 is not limited to the maximum speed ratio γmax of the CVT 40. In the case where the number of vehicle speed ranges SR for each accelerator operation amount is larger than that in the above configuration, the shift ECU 21 may set the target input rotational speed Nin* by using the fixed speed ratio if the current vehicle speed range SRp is a lower vehicle speed range SR such as the second vehicle speed range SR2 or the third vehicle speed range SR3. The shift ECU 21 may also set the target input rotational speed Nin* by using the fixed speed ratio if the current vehicle speed range SRp is a higher vehicle speed range SR (e.g., SR16 etc.). This can restrain fluctuations in input rotational speed Nin which occur at the timing the speed ratio γ is changed to the upshift side when the automobile 10 is traveling in the higher vehicle speed range, and can thus restrain a feel of frequent shift control, or what is called a busy feel, from being caused when the input rotational speed Nin is changed in a stepped manner.

In the above embodiment, the number of vehicle speed ranges SR for each accelerator operation amount is determined so as to increase as the accelerator operation amount increases. Since the speed ratio γ is thus changed in a larger number of steps as the accelerator operation amount by the driver increases, the intervals at which the speed ratio γ is changed to the upshift side in a stepped manner (shift intervals tint) can be made to be appropriate intervals that match driver's intention to accelerate. This can provide the driver with a better feel of acceleration, namely a better rhythmic driving feel. The number of vehicle speed ranges SR for each accelerator operation amount is not limited to the number described above. Inventors' research shows that drivability of various commercially available automobiles can be improved by setting the number of vehicle speed ranges SR for the maximum accelerator operation amount (100%) (the maximum number of steps) in the range of 12 to 48, and more preferably in the range of 16 to 36. In this case, in view of the fact that widely used common automatic transmissions have four, six, or eight shift speeds, the number of steps in which the speed ratio γ is changed in the case of the maximum accelerator operation amount (the maximum number of steps) may be set to a common multiple of all the values of 4, 6, 8 or a common multiple of at least two of the values of 4, 6, 8.

In the above embodiment, the increase gradient ΔNin is determined so as to increase as the accelerator operation amount increases and to decrease as the vehicle speed range SR is shifted to a higher vehicle speed range. In the case where the accelerator operation amount is large, the driver can typically be regarded as having a strong intension to accelerate. In the case where the accelerator operation amount is large and the vehicle speed is low, the driver can be regarded as having a stronger intension to accelerate. In the case where the vehicle speed is high, the driver can be regarded as having a weak intention to accelerate. In the case where the current vehicle speed V is low and the accelerator operation amount is small, the driver can be regarded as having a weaker intention to accelerate. Since the increase gradient ΔNin of the input rotational speed Nin is determined so as to increase as the accelerator operation amount increases and to decrease as the vehicle speed range SR is shifted to a higher vehicle speed range, the increase gradient ΔNin is increased as driver's intention to accelerate is stronger. This can provide the driver with a better feel of acceleration, namely a more direct driving feel and a better rhythmic driving feel. Moreover, the increase gradient ΔNin is reduced as driver's intention to accelerate is weaker. This can restrain a busy feel from being caused.

In the above embodiment, the shift interval tint is determined so as to decrease as the accelerator operation amount increases and to increase as the vehicle speed range SR is shifted to a higher vehicle speed range except for the case where the current vehicle speed range SRp is the lowest vehicle speed range SR1. The shift interval tint, that is, the interval at which the speed ratio γ is changed to the upshift side in a stepped manner, thus decreases as the accelerator operation amount increases. This can provide the driver with a better feel of acceleration, namely a better rhythmic driving feel, in the case where he/she has a strong intention to accelerate. Moreover, the shift interval tint increases as the vehicle speed range SR is shifted to a higher vehicle speed range except for the case where the current vehicle speed range SRp is the lowest vehicle speed range SR1. This can restrain frequent variations in engine sound etc. of the automobile 10 and can restrain a busy feel from being caused by deterioration of a rhythmic driving feel in the case where the driver has a weak intention to accelerate.

In the above embodiment, the mode select switch 100 that allows the driver to select between the normal mode (stepless shift mode) in which the speed ratio γ is changed steplessly and the sport mode (stepped shift mode) in which the speed ratio γ is changed in a stepped manner is connected to the shift ECU 21. The shift ECU 21 changes the speed ratio γ in a stepped manner when the sport mode is selected by the driver. Since the speed ratio γ is changed steplessly in the normal mode, fuel economy of the automobile 10 can be improved. Since the speed ratio γ is changed in a stepped manner in the sport mode, drivability of the automobile 10 can be improved.

Figure 8:
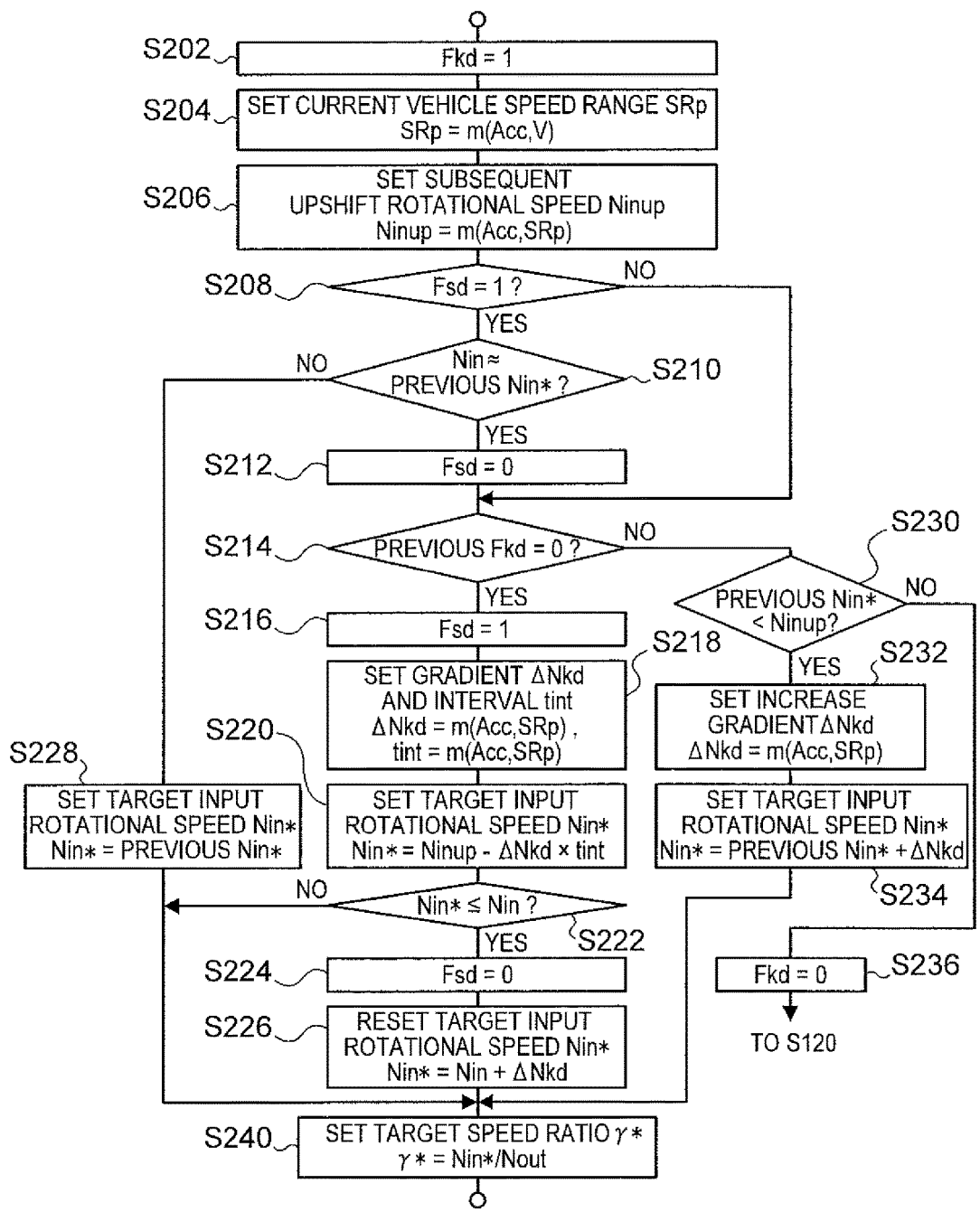
FIG. 8 is a flowchart showing an example of a target value setting process that is used when kickdown is performed.
Figure 9A:
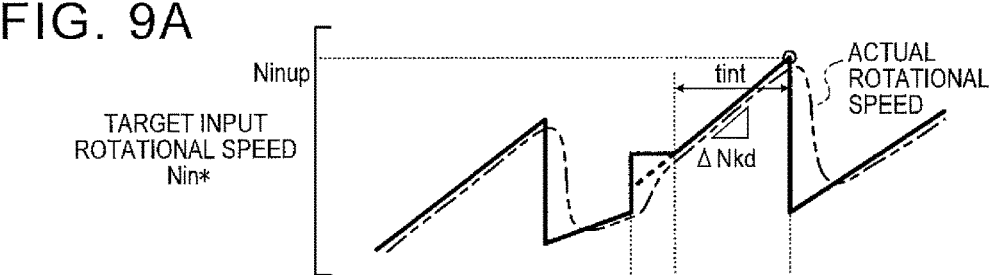
FIGS. 9A, 9B, 9C, and 9D are time charts showing how the values of a target input rotational speed, a current vehicle speed range, a kickdown flag, and a stepdown flag change when kickdown is performed.
Figure 9B:
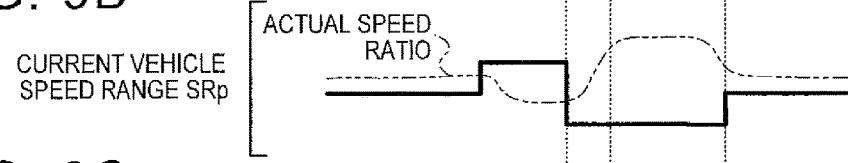
Figure 9C:
Figure 9D:
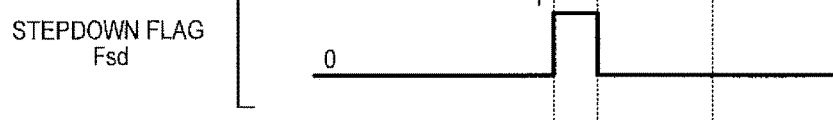

The target value setting process that is performed when kickdown is performed according to a kickdown operation by the driver of the automobile 10 will be described below. FIG. 8 is a flowchart showing an example of the target value setting process in step S200 that is performed when the shift ECU 21 determines in step S30 of FIG. 3 that kickdown need be performed.

As shown in FIG. 8, if the shift ECU 21 determines in step S30 that kickdown need be performed, the shift ECU 21 sets the kickdown flag Fkd to a value of 1 (step S202), and then obtains the vehicle speed range SR corresponding to the current accelerator operation amount Acc and the current vehicle speed V received in step S10 from the above vehicle speed range setting map, and sets the current vehicle speed range SRp to the obtained vehicle speed range SR (step S204). The shift ECU 21 also derives and sets a subsequent upshift rotational speed Ninup corresponding to the current accelerator operation amount Acc and the current vehicle speed range SRp based on the above subsequent upshift rotational speed setting map (step S206).

Subsequently, the shift ECU 21 determines whether or not the stepdown flag Fsd has a value of 1 (step S208). The stepdown flag Fsd is set to a value of 0 when kickdown is not performed. Accordingly, when kickdown is started, the shift ECU 21 makes a No determination (determines that Fsd=0) in step S208. If the shift ECU 21 determines in step S208 that the stepdown flag Fsd has a value of 0, it determines, based on the value (previous value) of the kickdown flag Fkd in the previous execution of the routine, whether or not it is when kickdown is started (step S214). If the shift ECU 21 determines in step S214 that the previous value of the kickdown flag Fkd is 0, it sets the stepdown flag Fsd to a value of 1 (step S216).

After setting the stepdown flag Fsd to a value of 1 in step S216, the shift ECU 21 sets an increase gradient ΔNkd based on the current accelerator operation amount Acc received in step S10 and the current vehicle speed range SRp set in step S204 and sets the shift interval tint based on the current accelerator operation amount Acc and the current vehicle speed range SRp (step S218). The increase gradient ΔNkd defines a variation (positive value) in input rotational speed Nin in each execution interval (time interval dt) of this routine in the case where the speed ratio γ is changed to the downshift side (to a higher speed ratio) according to a kickdown operation. The shift interval tint basically defines an approximate time interval from when the speed ratio γ of the CVT 40 is changed to the downshift side in a stepped manner until the next time the speed ratio γ is changed to the upshift side in a stepped manner.

According to the present embodiment, a kickdown gradient setting map that defines the increase gradients ΔNkd in the plurality of vehicle speed ranges SR for each accelerator operation amount (e.g., for each of the accelerator operation amounts of 100%, 70%, 50%, and 30%) is created in advance and stored in the ROM, not shown, of the shift ECU 21. The kickdown gradient setting map of the present embodiment assigns increase gradients ΔNkd determined through experiments and analysis to the vehicle speed ranges SR for each accelerator operation amount. As shown in FIGS. 6A to 6D, the kickdown gradient setting map is created such that the increase gradient ΔNkd increases as the accelerator operation amount increases, and decreases as the vehicle speed range SR is shifted to a higher vehicle speed range (see black triangles in FIG. 6). As can be seen from FIG. 6, the kickdown gradient setting map is created such that, for each accelerator operation amount, the increase gradient ΔNkd in each vehicle speed range SR is larger than the increase gradient ΔNin corresponding to (the combination of) the same accelerator operation amount and the same vehicle speed range SR which is obtained from the increase gradient setting map used in steps S120, S126.

In step S218, the shift ECU 21 performs a linear interpolation as needed and derives and sets an increase gradient ΔNkd corresponding to the current accelerator operation amount Acc and the current vehicle speed range SRp, based on the kickdown gradient setting map, and performs a linear interpolation as needed and derives and sets a shift interval tint corresponding to the current accelerator operation amount Acc and the current vehicle speed range SRp, based on the shift interval setting map that is used in steps S120, S126. In step S128, the shift ECU 21 may use a dedicated kickdown shift interval setting map created such that shift intervals tint that are used to perform kickdown are defined. Subsequently, the shift ECU 21 sets a target input rotational speed Nin* for this time to a value obtained by subtracting the product of the increase gradient ΔNkd and the shift interval tint from the subsequent upshift rotational speed Ninup set in step S206 (step S220).

After setting the target input rotational speed Nin* in step S220, the shift ECU 21 determines whether or not the set target input rotational speed Nin* is equal to or lower than the input rotational speed Nin received in step S10 (step S222). If the shift ECU 21 determines that the target input rotational speed Nin* is higher than the input rotational speed Nin, it sets a target speed ratio γ* of the CVT 40 by dividing the target input rotational speed Nin* set in step S222 by the output rotational speed Nout received in step S10 (step S240), and then performs hydraulic control in step S150. The shift ECU 21 repeats the processes of step S10 and the subsequent steps as long as the accelerator pedal 91 is depressed.

If the shift ECU 21 determines in step S222 that the target input rotational speed Nin* is equal to or lower than the input rotational speed Nin, it sets the stepdown flag Fsd to a value of 0 (step S224) and then resets the target input rotational speed Nin* to the sum of the input rotational speed Nin received in step S10 and the increase gradient ΔNkd set in step S218 (step S226). Accordingly, at the time a kickdown operation is performed, the target input rotational speed Nin* can be higher than the input rotational speed Nin at that time (current input rotational speed). This can reliably restrain the speed ratio γ from not changing to the downshift side. In the case where the shift ECU 21 resets the target input rotational speed Nin* in step S226, it sets the target speed ratio γ of the CVT 40 (step S240) and then performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S220 and then performs the target value setting process of step S200, it also performs the processes of steps S202, S204, S206 and determines in step S208 whether or not the stepdown flag Fsd has a value of 1. If the shift ECU 21 has determined in step S222 that the target input rotational speed Nin* is higher than the input rotational speed Nin, the stepdown flag Fsd has been maintained at a value of 1. The shift ECU 21 therefore determines in step S208 that the stepdown flag Fsd has a value of 1. The shift ECU 21 then determines whether or not the input rotational speed Nin of the CVT 40 received in step S10 is approximately the same as the previous value of the target input rotational speed Nin* (whether or not the input rotational speed Nin is included in a relatively small range around the previous value) (step S210).

If the shift ECU 21 determines in step S210 that the input rotational speed Nin of the CVT 40 is not approximately the same as the previous value of the target input rotational speed Nin*, it sets a target input rotational speed Nin* for this time to the previous value of the target input rotational speed Nin* (step S228). The shift ECU 21 further sets a target speed ratio γ* of the CVT 40 by dividing the set target input rotational speed Nin* by the output rotational speed Nout received in step S10 (step S240) and then performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S228 and then performs the target value setting process of step S200, it also performs the processes of steps S202, S204, S206 and determines in step S208 whether or not the stepdown flag Fsd has a value of 1. In this case as well, since the stepdown flag Fsd has been maintained at a value of 1, the shift ECU 21 determines in step S208 that the stepdown flag Fsd has a value of 1. The shift ECU 21 then determines whether or not the input rotational speed Nin is approximately the same as the previous value of the target input rotational speed Nin* (step S210). If the shift ECU 21 determines in step S210 that the input rotational speed Nin of the CVT 40 is not approximately the same as the previous value of the target input rotational speed Nin*, it sets a target input rotational speed Nin* for this time to the previous value of the target input rotational speed Nin* (step S228).

Accordingly, as shown in FIG. 9, the target input rotational speed Nin* is continuously set to the value calculated in step S220 (subsequent upshift rotational speed Ninup ΔNkd×tint) from when the target input rotational speed Nin* is set based on the subsequent upshift rotational speed Ninup, the increase gradient ΔNkd, and the shift interval tint in step S220 (time t20 in FIG. 9) until the shift ECU 21 determines in step S210 that the input rotational speed Nin of the CVT 40 is approximately the same as the previous value of the target input rotational speed Nin* (time t21 in FIG. 9). As shown in FIG. 9, the shift ECU 21 can thus relatively sharply increase the input rotational speed Nin of the CVT 40 to change the speed ratio γ to the downshift side in a stepped manner.

In the case where the shift ECU 21 perform the processes of steps S202, S204, S206, S208 and then determines in step S210 that the input rotational speed Nin of the CVT 40 is approximately the same as the previous value of the target input rotational speed Nin*, it sets the stepdown flag Fsd to a value of 0 (step S212) and performs the above determination process of step S214. In this case, since it is not when kickdown is started, the shift ECU 21 does not perform the processes of step S216 and the subsequent steps and determines whether or not the previous value of the target input rotational speed Nin* is lower than the subsequent upshift rotational speed Ninup set in step S206 (whether or not the target input rotational speed Nin* has reached the subsequent upshift rotational speed Ninup) (step S230).

If the shift ECU 21 determines in step S230 that the previous value of the target input rotational speed Nin* is lower than the subsequent upshift rotational speed Ninup set in step S206, it derives and sets, based on the above kickdown gradient setting map, an increase gradient ΔNkd corresponding to the current accelerator operation amount Acc received in step S10 and the current vehicle speed range SRp set in step S204 in a manner similar to that in step S218 (step S232). The shift ECU 21 then sets a target input rotational speed Nin* for this time to the sum of the previous value of the target input rotational speed Nin* and the increase gradient ΔNkd set in step S232 (step S234) and sets a target speed ratio γ* of the CVT 40 by dividing the set target input rotational speed Nin* by the output rotational speed Nout received in step S10 (step S240). The shift ECU 21 further performs hydraulic control in step S150. The shift ECU 21 repeats the processes of step S10 and the subsequent steps as long as the accelerator pedal 91 is depressed.

In the case where the shift ECU 21 sets the target input rotational speed Nin* in step S234 and then performs the target value setting process of step S200, it performs the processes of steps S202, S204, S206 and then determines in step S208 whether or not the stepdown flag Fsd has a value of 1. In this case, since the stepdown flag Fsd is set to a value of 0 in step S212 and it is not when kickdown is started, the shift ECU 21 performs the determination process of step S214 and then determines whether or not the previous value of the target input rotational speed Nin* is equal to or higher than the subsequent upshift rotational speed Ninup set in step S206 (step S230). If the shift ECU 21 determines in step S230 that the previous value of the target input rotational speed Nin* is lower than the subsequent upshift rotational speed Ninup, it sets an increase gradient ΔNkd corresponding to the current accelerator operation amount Acc and the current vehicle speed range SRp (step S232) and sets a target input rotational speed Nin* for this time to the sum of the previous value of the target input rotational speed Nin* and the increase gradient ΔNkd (step S234).

Accordingly, as shown in FIG. 9, the target input rotational speed Nin* is continuously set to the sum of the previous value of the target input rotational speed Nin* and the increase gradient ΔNkd in step S234 from when the input rotational speed Nin of the CVT 40 increases according to the target input rotational speed Nin* set in step S220 and the shift ECU 21 determines in step S210 that the input rotational speed Nin of the CVT 40 is approximately the same as this target input rotational speed Nin* (time t21 in FIG. 9) until the shift ECU 21 determines in step S230 that the previous value of the target input rotational speed Nin* has become equal to or higher than (has reached) the subsequent upshift rotational speed Ninup set in step S206 (time t22 in FIG. 9). Therefore, in the case where the accelerator operation amount is approximately constant and the current vehicle speed range SRp is the same, the input rotational speed Nin of the CVT 40 can be increased according to the fixed increase gradient ΔNkd corresponding to the current accelerator operation amount Acc and the current vehicle speed range SRp, and the speed ratio γ can be changed to the upshift side in a stepped manner after the shift interval tint (time t22 in FIG. 9) from the timing the input rotational speed Nin is increased according to the target input rotational speed Nin* set in step S220 (time t21 in FIG. 9). Even if the accelerator operation amount Acc or the current vehicle speed range SRp (current vehicle speed V) changes after the speed ratio γ is changed to the downshift side in a stepped manner, the increase gradient ΔNkd can be changed so as to correspond to the current accelerator operation amount Acc and the current vehicle speed range SRp, and the input rotational speed Nin can be increased according to the resultant increase gradient ΔNkd.

In the case where the shift ECU 21 resets the target input rotational speed Nin* in step S226 and then performs the target value setting process of step S200, it performs the above processes of steps S202, S204, S206 and determines in step S208 whether or not the stepdown flag Fsd has a value of 1. In the case where the shift ECU 21 resets the target input rotational speed Nin* in S226, it has determined in step S222 that the target input rotational speed Nin* is equal to or lower than the input rotational speed Nin and has set the stepdown flag Fsd to a value of 0 in step S224. Accordingly, the shift ECU 21 determines in step S208 that the stepdown flag Fsd has a value of 0. The shift ECU 21 performs the determination process of step S214 rather than performing the determination process of step S210. In this case, since it is not when kickdown is started, the shift ECU 21 does not preform the processes of step S216 and the subsequent steps and determines whether or not the previous value of the target input rotational speed Nin* is lower than the subsequent upshift rotational speed Ninup set in step S206 (whether or not the target input rotational speed Nin* has reached the subsequent upshift rotational speed Ninup) (step S230).

If the shift ECU 21 determines in step S230 that the previous value of the target input rotational speed Nin* is lower than the subsequent upshift rotational speed Ninup, it sets an increase gradient ΔNkd corresponding to the current accelerator operation amount Acc and the current vehicle speed range SRp (step S232) and sets a target input rotational speed Nin* for this time to the sum of the previous value of the target input rotational speed Nin* and the increase gradient ΔNkd (step S234). The shift ECU 21 also sets a target speed ratio γ* of the CVT 40 by dividing the target input rotational speed Nin* by the output rotational speed Nout (step S240) and then performs hydraulic control in step S150. The shift ECU 21 repeats the processes of step S10 and the subsequent steps as long as the accelerator pedal 91 is depressed.

Accordingly, in the case where the shift ECU 21 determines that the target input rotational speed Nin* set in step S220 is equal to or lower than the input rotational speed Nin (step S222) and resets the target input rotational speed Nin* to the sum of the input rotational speed Nin (current input rotational speed) and the increase gradient ΔNkd (step S226), it sets the target input rotational speed Nin* such that the input rotational speed Nin changes according to the increase gradient ΔNkd from the timing the speed ratio γ is changed to the downshift side according to a kickdown operation (time t20 in FIG. 9) until the shift ECU 21 determines in step S230 that the previous value of the target input rotational speed Nin* has become equal to or higher than (has reached) the subsequent upshift rotational speed Ninup set in step S206 (time t22 in FIG. 9) (see steps S226, S234 and a dashed line in FIG. 9). As described above, even though the target input rotational speed Nin* is set such that the input rotational speed Nin increases according to the increase gradient ΔNkd corresponding to the current accelerator operation amount Acc and the current vehicle speed range SRp from the timing the speed ratio γ is changed to the downshift side according to a kickdown operation until the target input rotational speed Nin* (previous value) reaches the subsequent upshift rotational speed Ninup, setting the increase gradient ΔNkd to a relatively large value can give the driver a feeling that acceleration that matches his/her intention to accelerate has been achieved, whereby the driver can be provided with a more direct driving feel.

In the case where the shift ECU 21 performs the processes of steps S202, S204, S206, S208, S214 and then determines in step S230 that the previous value of the target input rotational speed Nin* is equal to or higher than the subsequent upshift rotational speed Ninup set in step S102, it sets the kickdown flag Fkd to a value of 0 in step S236 (time t22 in FIG. 9) and then performs the processes of step S120 and the subsequent steps in FIG. 4. The shift ECU 21 repeats the processes of step S10 and the subsequent steps as long as the accelerator pedal 91 is depressed.

As described above, when performing kickdown, the shift ECU 21 as a control device for the CVT 40 obtains, at the predetermined time intervals dt, the current vehicle speed range SRp corresponding to the current accelerator operation amount Acc and the current vehicle speed V from a plurality of vehicle speed ranges SR determined for each accelerator operation amount by dividing a possible vehicle speed range for each accelerator operation amount into a plurality of ranges (vehicle speed range setting map), namely obtains, at the predetermined time intervals dt, the vehicle speed range SR including the current vehicle speed V from the plurality of vehicle speed ranges SR corresponding to the current accelerator operation amount Acc (step S204). The shift ECU 21 also sets, at the time intervals dt, a subsequent upshift rotational speed Ninup, i.e., a target value of the input rotational speed Nin which is used the next time the speed ratio γ is changed to the upshift side in a stepped manner, based on at least the current accelerator operation amount Acc (step S206). The shift ECU 21 further sets, in response to a kickdown operation, the target input rotational speed Nin* to a value higher than the input rotational speed Nin at that time (current input rotational speed) such that the speed ratio γ is changed to the downshift side in a stepped manner (step S220). After the input rotational speed Nin increases according to the target input rotational speed Nin* set in step S220, the shift ECU 21 obtains, at the time intervals dt, an increase gradient ΔNkd corresponding to the current accelerator operation amount Acc and the current vehicle speed range SRp from the increase gradients ΔNkd of the input rotational speed Nin which are determined for the plurality of vehicle speed ranges SR for each accelerator operation amount (kickdown gradient setting map) (step S232), and sets, at the time intervals dt, the target input rotational speed Nin* such that the input rotational speed Nin changes according to the increase gradient ΔNkd corresponding to the current accelerator operation amount Acc and the current vehicle speed range SRp until the target input rotational speed Nin* (previous value) reaches the subsequent upshift rotational speed Ninup (step S234).

Namely, the shift ECU 21 sets the target input rotational speed Nin* such that the input rotational speed Nin is increased according to a kickdown operation to change the speed ratio γ to the downshift side in a stepped manner and then the input rotational speed Nin increases according to the increase gradient ΔNkd corresponding to the current accelerator operation amount Acc and the current vehicle speed range SRp. Accordingly, in the case where the accelerator operation amount has been approximately constant and the current vehicle speed range SRp has been the same since the kickdown operation, the input rotational speed Nin can be increased according to the fixed increase gradient ΔNkd corresponding to the current accelerator operation amount Acc and the current vehicle speed range SRp. Even if the accelerator operation amount or the current vehicle speed range SRp (vehicle speed) changes after the kickdown operation, the increase gradient ΔNkd can be changed so as to correspond to the current accelerator operation amount Acc and the current vehicle speed range SRp, and the input rotational speed Nin can be increased according to the resultant increase gradient ΔNkd. This gives the driver a feeling that acceleration that matches his/her intention to accelerate has been achieved, after the kickdown operation is performed, whereby the driver can be provided with a more direct driving feel. A better feel of acceleration and improved drivability of the automobile 10 equipped with the CVT 40 can thus be achieved.

The shift ECU 21 also obtains a shift interval tint corresponding to the current accelerator operation amount Acc and the current vehicle speed range SRp from the plurality of shift intervals tint determined for the plurality of vehicle speed ranges SR for each accelerator operation amount (shift interval setting map) as a time from the timing the input rotational speed Nin has increased according to the target input rotational speed Nin* set in step S220 until the next time the speed ratio γ is changed to the upshift side in a stepped manner (step S218). The shift ECU 21 then sets, in response to a kickdown operation, a target input rotational speed Nin* based on the subsequent upshift rotational speed Ninup set in step S206 and the increase gradient ΔNkd and the shift interval tint obtained in step S218 (step S220). Accordingly, at the timing the speed ratio γ is changed to the downshift side in a stepped manner in response to the kickdown operation, the input rotational speed Nin can be increased by an amount corresponding to the increase gradient ΔNkd that is used to subsequently increase the input rotational speed Nin. The subsequent timing the speed ratio γ is changed to the up shift side in a stepped manner can thus be made to be a more appropriate timing that matches driver's intention to accelerate.

If the target input rotational speed Nin* set based on the subsequent upshift rotational speed Ninup, the increase gradient ΔNkd, and the shift interval tint in step S220 is equal to or lower than the input rotational speed Nin (current input rotational speed), the shift ECU 21 resets the target input rotational speed Nin* based on the input rotational speed Nin and the increase gradient ΔNkd (step S226). If the shift ECU 21 determines in step S220 that the target input rotational speed Nin* set in step S220 is equal to or lower than the input rotational speed Nin, it sets the target input rotational speed Nin* such that the input rotational speed Nin changes according to the increase gradient ΔNkd from the timing the speed ratio γ is changed to the downshift side in response to the kickdown operation until the target input rotational speed Nin* (previous value) reaches the subsequent upshift rotational speed Ninup (steps S226, S234).

This can reliably restrain the speed ratio γ of the CVT 40 from not changing to the downshift side when the kickdown operation is performed. Moreover, setting the increase gradient ΔNkd to a relatively large value can give the driver a feeling that acceleration that matches his/her intention to accelerate has been achieved, after the kickdown operation is performed, whereby the driver can be provided with a more direct driving feel. Accordingly, depending on the vehicles equipped with the CVT 40, the increase gradient ΔNkd may be set to a sufficiently large value. The processes of steps S216 to S228 etc. may thus be omitted, and the target input rotational speed Nin* may be set such that the input rotational speed Nin changes according to the increase gradient ΔNkd from the timing the speed ratio γ is changed to the downshift side in response to the kickdown operation until the target input rotational speed Nin* reaches the subsequent upshift rotational speed Ninup.

In the above embodiment, the shift interval tint is determined so as to decrease as the accelerator operation amount increases and to increase as the vehicle speed range SR is shifted to a higher vehicle speed range except for the case where the current vehicle speed range SRp is the lowest vehicle speed range SR1. The shift interval tint, namely the interval from when the kickdown operation is performed until the next time the speed ratio is changed to the upshift side in a stepped manner, thus decreases as the accelerator operation amount increases. This can provide the driver with a better feel of acceleration, namely a better rhythmic driving feel, in the case where the driver has a strong intention to accelerate. Moreover, the shift interval tint increases as the vehicle speed range SR is shifted to a higher vehicle speed range except for the case where the current vehicle speed range SRp is the lowest vehicle speed range SR1. This can restrain frequent variations in engine sound etc. of the automobile 10 and can restrain a busy feel from being caused by deterioration of a rhythmic driving feel in the case where the driver has a weak intention to accelerate.

In the above embodiment, the increase gradient ΔNkd obtained from the kickdown gradient setting map is larger than the increase gradient ΔNin corresponding to (the combination of) the same accelerator operation amount and the same vehicle speed range SR which is obtained from the increase gradient setting map when a stepped upshift is performed. This can provide the driver with a more direct driving feel and a better rhythmic driving feel during the period from when the kickdown operation is performed until the next time the speed ratio γ is changed to the upshift side in a stepped manner.

The CVT 40 is not limited to a belt-type continuously variable transmission. For example, the CVT 40 may be configured as a toroidal continuously variable transmission, a cone continuously variable transmission, etc. Instead of the accelerator operation amount, opening of the throttle valve 13 may be used as a parameter that is used to change the speed ratio γ of the CVT 40 in a stepped manner.

As described above, a control device for a continuously variable transmission according to the present disclosure is a control device for a continuously variable transmission, which sets a target input rotational speed, or a target value of an input rotational speed of the continuously variable transmission mounted on a vehicle, such that a speed ratio is changed in a stepped manner and which controls the continuously variable transmission such that the input rotational speed becomes equal to the target input rotational speed, the control device including: an electronic control unit that includes control logic, which when executed: obtains a current accelerator operation amount and a current vehicle speed; obtains a current vehicle speed range corresponding to the current accelerator operation amount and the current vehicle speed from a plurality of vehicle speed ranges that are determined for each accelerator operation amount by dividing a possible vehicle speed range for the accelerator operation amount into a plurality of ranges; obtains an increase gradient corresponding to the current accelerator operation amount and the current vehicle speed range from increase gradients of the input rotational speed which are determined for the plurality of vehicle speed ranges for each accelerator operation amount; sets, at a timing the speed ratio is changed to an upshift side in a stepped manner, the target input rotational speed to a value lower than a current input rotational speed; and sets, after the input rotational speed is set, the target input rotational speed such that the input rotational speed changes according to the increase gradient obtained.

This control device for the continuously variable transmission obtains a current vehicle speed range corresponding to the current accelerator operation amount and the current vehicle speed from the plurality of vehicle speed ranges that are determined for each accelerator operation amount by dividing a possible vehicle speed range for each accelerator operation amount into a plurality of ranges. Namely, this control device obtains a vehicle speed range including the current vehicle speed from the plurality of vehicle speed ranges corresponding to the current accelerator operation amount. This control device also obtains an increase gradient corresponding to the current accelerator operation amount and the current vehicle speed range from the increase gradients of the input rotational speed which are determined for the plurality of vehicle speed ranges for each accelerator operation amount. This control device sets, at the timing the speed ratio is changed to the upshift side in a stepped manner, the target input rotational speed to a value lower than the current input rotational speed, and then sets the target input rotational speed such that the input rotational speed changes according to the increase gradient corresponding to the current accelerator operation amount and the current vehicle speed range. Accordingly, in the case of changing the speed ratio of the continuously variable transmission to the upshift side, the input rotational speed can be reduced to change the speed ratio to the upshift side in a stepped manner. If the accelerator operation amount is approximately constant and the current vehicle speed range is the same, the input rotational speed can be increased according to the fixed increase gradient corresponding to the current accelerator operation amount and the current vehicle speed range. Even if the accelerator operation amount or the current vehicle speed range (vehicle speed) changes after the speed ratio starts being changed to the upshift side in a stepped manner, the increase gradient can be changed so as to correspond to the current accelerator operation amount and the current vehicle speed range, and the input rotational speed can be increased according to the resultant increase gradient. Accordingly, this control device gives the driver of the vehicle equipped with the continuously variable transmission a feeling that (direct) acceleration that matches his/her intention to accelerate has been achieved, after the speed ratio is changed to the upshift side in a stepped manner. The driver can thus be provided with a more direct feel of acceleration, i.e., a more direct driving feel. A better feel of acceleration and improved drivability of the vehicle equipped with the continuously variable transmission can thus be achieved.

The number of vehicle speed ranges for each accelerator operation amount may increase as the accelerator operation amount increases. Since the speed ratio is thus changed in a larger number of steps as the accelerator operation amount by the driver of the vehicle increases, the intervals at which the speed ratio is changed to the upshift side in a stepped manner (shift intervals) can be made to be appropriate intervals that match driver's intention to accelerate. This can provide the driver with a better feel of acceleration, namely a better rhythmic driving feel.

The increase gradient may be determined so as to increase as the accelerator operation amount increases and to decrease as the vehicle speed range is shifted to a higher vehicle speed range. In the case where the accelerator operation amount is large, the driver can typically be regarded as having a strong intension to accelerate. In the case where the accelerator operation amount is large and the vehicle speed is low, the driver can be regarded as having a stronger intension to accelerate. In the case where the vehicle speed is high, the driver can be regarded as having a weak intention to accelerate. In the case where the current vehicle speed is low and the accelerator operation amount is small, the driver can be regarded as having a weaker intention to accelerate. Since the increase gradient of the input rotational speed is determined so as to increase as the accelerator operation amount increases and to decrease as the vehicle speed range is shifted to a higher vehicle speed range, the increase gradient is increased as driver's intention to accelerate is stronger. This can provide the driver with a better feel of acceleration, namely a more direct driving feel and a better rhythmic driving feel. Moreover, the increase gradient is reduced as driver's intention to accelerate is weaker. This can restrain what is called a busy feel from being caused.

The electronic control unit further sets a subsequent upshift rotational speed, or a target value of the input rotational speed which is used the next time the speed ratio is changed to the upshift side in a stepped manner, based on at least the current accelerator operation amount, wherein the electronic control unit may set the target input rotational speed such that the input rotational speed changes according to the increase gradient obtained from when the input rotational speed is set until the target input rotational speed reaches the subsequent upshift rotational speed set.

The electronic control unit may further obtain a shift interval corresponding to the current accelerator operation amount and the current vehicle speed range from a plurality of shift intervals determined for the plurality of vehicle speed ranges for each accelerator operation amount as a time from the timing the speed ratio is changed to the upshift side in a stepped manner until the next time the speed ratio is changed to the upshift side in a stepped manner, wherein the electronic control unit may set, at the timing the speed ratio is changed to the upshift side in a stepped manner, the target input rotational speed based on the subsequent upshift rotational speed set, the increase gradient obtained, and the shift interval obtained. Accordingly, at the timing the speed ratio is changed to the upshift side in a stepped manner, the input rotational speed can be reduced by an amount corresponding to the increase gradient that is used to subsequently increase the input rotational speed. The subsequent timing the speed ratio is changed to the upshift side in a stepped manner can thus be made to be a more appropriate timing that matches driver's intention to accelerate.

The shift interval may be determined so as to decrease as the accelerator operation amount increases and to increase as the vehicle speed range is shifted to a higher vehicle speed range except for the case where the current vehicle speed range is a lowest vehicle speed range. The shift interval, namely the interval at which the speed ratio is changed to the upshift side in a stepped manner, thus decreases as the accelerator operation amount increases. This can provide the driver with a better feel of acceleration, namely a better rhythmic driving feel, in the case where the driver has a strong intention to accelerate. Moreover, the shift interval increases as the vehicle speed range is shifted to a higher vehicle speed range except for the case where the current vehicle speed range is the lowest vehicle speed range. This can restrain frequent variations in engine sound etc. of the vehicle and can restrain a busy feel from being caused by deterioration of a rhythmic driving feel in the case where the driver has a weak intention to accelerate.

The electronic control unit may further set, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational speed set. The target input rotational speed is thus set by using the fixed speed ratio until the target input rotational speed reaches the subsequent upshift rotational speed. Accordingly, in the case where the predetermined vehicle speed range is a lower vehicle speed range, this configuration can ensure satisfactory acceleration performance of the vehicle in the lower vehicle speed range. In the case where the predetermined vehicle speed range is a higher vehicle speed range, this configuration can restrain fluctuations in input rotational speed which occur at the timing the speed ratio is changed to the upshift side, and can restrain a busy feel from being caused when the input rotational speed is changed in a stepped manner.

The control device may further include a mode select switch that allows a driver to select between a stepless shift mode in which the speed ratio is changed steplessly and a stepped shift mode in which the speed ratio is changed in a stepped manner, wherein the continuously variable transmission may be controlled such that the speed ratio is changed in a stepped manner when the stepped shift mode is selected by the driver. Since the speed ratio is changed steplessly in the stepless shift mode, fuel economy of the vehicle can be improved. Since the speed ratio is changed in a stepped manner in the stepped shift mode, drivability of the vehicle can be improved.

A control method for a continuously variable transmission according to the present disclosure is a control method for a continuously variable transmission, in which a target input rotational speed, or a target value of an input rotational speed of the continuously variable transmission mounted on a vehicle, is set such that a speed ratio is changed in a stepped manner and in which the continuously variable transmission is controlled such that the input rotational speed becomes equal to the target input rotational speed, the method including the steps of:

(a) setting, at a timing the speed ratio is changed to an upshift side in a stepped manner, the target input rotational speed to a value lower than a current input rotational speed;

(b) obtaining a current vehicle speed range corresponding to a current accelerator operation amount and a current vehicle speed from a plurality of vehicle speed ranges that are determined for each accelerator operation amount by dividing a possible vehicle speed range for the accelerator operation amount into a plurality of ranges;

(c) obtaining an increase gradient corresponding to the current accelerator operation amount and the current vehicle speed range obtained in the step (b) from increase gradients of the input rotational speed which are determined for the plurality of vehicle speed ranges for each accelerator operation amount; and (d) setting the target input rotational speed such that the input rotational speed changes according to the increase gradient obtained in the step (c), wherein the steps (b), (c), and (d) are performed at predetermined time intervals after the target input rotational speed is set in the step (a).

This method gives the driver of the vehicle equipped with the continuously variable transmission a feeling that (direct) acceleration that matches his/her intention to accelerate has been achieved, after the speed ratio is changed to the upshift side in a stepped manner. The driver can thus be provided with a more direct feel of acceleration, i.e., a more direct driving feel. A better feel of acceleration and improved drivability of the vehicle equipped with the continuously variable transmission can thus be achieved.

In the above embodiment, the shift ECU 21 that executes the shift control routine of FIG. 3 to control the CVT 40 as a continuously variable transmission corresponds to the "control device." The shift ECU 21 that receives the current accelerator operation amount Acc in step S10 corresponds to the "accelerator operation amount obtaining means." The shift ECU 21 that receives the current vehicle speed V in step S10 corresponds to the "vehicle speed obtaining means." The shift ECU 21 that sets the current vehicle speed range SRp in step S102 corresponds to the "vehicle speed range obtaining means." The shift ECU 21 that sets the increase gradient ΔNin in steps S120, S126 corresponds to the "gradient obtaining means." The shift ECU 21 that sets the target input rotational speed Nin* in step S122 corresponds to the "first target rotational speed setting means." The shift ECU 21 that sets the target input rotational speed Nin* in step S128 corresponds to the "second target rotational speed setting means." The shift ECU 21 that sets the subsequent upshift rotational speed Ninup in step S104 corresponds to the "subsequent upshift rotational speed setting means." The shift ECU 21 that sets the shift interval tint in step S120 corresponds to the "shift interval obtaining means." The shift ECU 21 that sets the target input rotational speed Nin* in step S109 corresponds to the "third target rotational speed setting means."

The present disclosure is not limited in any way to the above embodiment, and various modifications can be made without departing from the spirit and scope of the present disclosure. The above mode for carrying out the disclosure is merely shown as a specific form of the disclosure described in "SUMMARY" and is not intended to limit the elements of the disclosure described in "SUMMARY."

INDUSTRIAL APPLICABILITY

The present disclosure is applicable to manufacturing industries of power transmission device, etc.

The invention claimed is:

1. A control device for a continuously variable transmission, which sets a target input rotational speed, or a target value of an input rotational speed of the continuously variable transmission mounted on a vehicle, such that a speed ratio is changed in a stepped manner and which controls the continuously variable transmission such that the input rotational speed becomes equal to the target input rotational speed, the control device comprising:
an electronic control unit that includes control logic, which when executed:
obtains a current accelerator operation amount and a current vehicle speed;
obtains a current vehicle speed range corresponding to the current accelerator operation amount and the current vehicle speed from a plurality of vehicle speed ranges that are determined for each accelerator operation amount by dividing a possible vehicle speed range for the accelerator operation amount into a plurality of ranges;
obtains an increase gradient corresponding to the current accelerator operation amount and the current vehicle speed range from increase gradients of the input rotational speed which are determined for the plurality of vehicle speed ranges for each accelerator operation amount;
sets, at a timing the speed ratio is changed to an upshift side in a stepped manner, the target input rotational speed to a value lower than a current input rotational speed; and
sets, after the input rotational speed is set, the target input rotational speed such that the input rotational speed changes according to the increase gradient obtained.

2. The control device for the continuously variable transmission according to claim 1, wherein
the number of vehicle speed ranges for the accelerator operation amount increases as the accelerator operation amount increases.

3. The control device for the continuously variable transmission according to claim 2, wherein:
the electronic control unit sets a subsequent upshift rotational speed, or a target value of the input rotational speed which is used the next time the speed ratio is changed to the upshift side in a stepped manner, based on at least the current accelerator operation amount, and
the electronic control unit sets the target input rotational speed such that the input rotational speed changes according to the increase gradient obtained from when the input rotational speed is set until the target input rotational speed reaches the subsequent upshift rotational speed set.

4. The control device for the continuously variable transmission according to claim 3, wherein:
the electronic control unit obtains a shift interval corresponding to the current accelerator operation amount and the current vehicle speed range from a plurality of shift intervals determined for the plurality of vehicle speed ranges for each accelerator operation amount as a time from the timing the speed ratio is changed to the upshift side in a stepped manner until the next time the speed ratio is changed to the upshift side in a stepped manner, and
the electronic control unit sets, at the timing the speed ratio is changed to the upshift side in a stepped manner, the target input rotational speed based on the subsequent upshift rotational speed set, the increase gradient obtained and the shift interval obtained.

5. The control device for the continuously variable transmission according to claim 4, wherein:
the shift interval is determined so as to decrease as the accelerator operation amount increases and to increase as the vehicle speed range is shifted to a higher vehicle speed range except for the case where the current vehicle speed range is a lowest vehicle speed range.

6. The control device for the continuously variable transmission according to claim 5, wherein:
the electronic control unit sets, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational set.

7. The control device for the continuously variable transmission according to claim 6, further comprising:
a mode select switch that allows a driver to select between a stepless shift mode in which the speed ratio is changed steplessly and a stepped shift mode in which the speed ratio is changed in a stepped manner, wherein the continuously variable transmission is controlled such that the speed ratio is changed in a stepped manner when the stepped shift mode is selected by the driver.

8. The control device for the continuously variable transmission according to claim 2, wherein:
the electronic control unit sets a subsequent upshift rotational speed, or a target value of the input rotational speed which is used the next time the speed ratio is changed to the upshift side in a stepped manner, based on at least the current accelerator operation amount, and
the electronic control unit sets the target input rotational speed such that the input rotational speed changes according to the increase gradient obtained from when the input rotational speed is set until the target input rotational speed reaches the subsequent upshift rotational speed set.

9. The control device for the continuously variable transmission according to claim 8, wherein:
the electronic control unit obtains a shift interval corresponding to the current accelerator operation amount and the current vehicle speed range from a plurality of shift intervals determined for the plurality of vehicle speed ranges for each accelerator operation amount as a time from the timing the speed ratio is changed to the upshift side in a stepped manner until the next time the speed ratio is changed to the upshift side in a stepped manner, and
the electronic control unit sets, at the timing the speed ratio is changed to the upshift side in a stepped manner, the target input rotational speed based on the subsequent upshift rotational speed set, the increase gradient obtained and the shift interval obtained.

10. The control device for the continuously variable transmission according to claim 9, wherein
the shift interval is determined so as to decrease as the accelerator operation amount increases and to increase as the vehicle speed range is shifted to a higher vehicle speed range except for the case where the current vehicle speed range is a lowest vehicle speed range.

11. The control device for the continuously variable transmission according to claim 9, wherein:
the electronic control unit sets, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational speed set.

12. The control device for the continuously variable transmission according to claim 8, wherein:
the electronic control unit sets, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational speed set.

13. The control device for the continuously variable transmission according to claim 1, wherein
the increase gradient is determined so as to increase as the accelerator operation amount increases and to decrease as the vehicle speed range is shifted to a higher vehicle speed range.

14. The control device for the continuously variable transmission according to claim 13, wherein:

the electronic control unit sets a subsequent upshift rotational speed, or a target value of the input rotational speed which is used the next time the speed ratio is changed to the upshift side in a stepped manner, based on at least the current accelerator operation amount, and
the electronic control unit sets the target input rotational speed such that the input rotational speed changes according to the increase gradient obtained from when the input rotational speed is set until the target input rotational speed reaches the subsequent upshift rotational speed set.

15. The control device for the continuously variable transmission according to claim 14, wherein:
the electronic control unit obtains a shift interval corresponding to the current accelerator operation amount and the current vehicle speed range from a plurality of shift intervals determined for the plurality of vehicle speed ranges for each accelerator operation amount as a time from the timing the speed ratio is changed to the upshift side in a stepped manner until the next time the speed ratio is changed to the upshift side in a stepped manner, and
the electronic control unit sets, at the timing the speed ratio is changed to the upshift side in a stepped manner, the target input rotational speed based on the subsequent upshift rotational speed set, the increase gradient obtained, and the shift interval obtained.

16. The control device for the continuously variable transmission according to claim 15, wherein
the shift interval is determined so as to decrease as the accelerator operation amount increases and to increase as the vehicle speed range is shifted to a higher vehicle speed range except for the case where the current vehicle speed range is a lowest vehicle speed range.

17. The control device for the continuously variable transmission according to claim 15, wherein:
the electronic control unit sets, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational speed set.

18. The control device for the continuously variable transmission according to claim 14, wherein:
the electronic control unit sets, in the case where the current vehicle speed range is a predetermined vehicle speed range, the target input rotational speed based on a predetermined fixed speed ratio and an output rotational speed of the continuously variable transmission until the target input rotational speed reaches the subsequent upshift rotational speed set.

19. The control device for the continuously variable transmission according to claim 1, further comprising:
a mode select switch that allows a driver to select between a stepless shift mode in which the speed ratio is changed steplessly and a stepped shift mode in which the speed ratio is changed in a stepped manner, wherein
the continuously variable transmission is controlled such that the speed ratio is changed in a stepped manner when the stepped shift mode is selected by the driver.

20. A control method for a continuously variable transmission, in which a target input rotational speed, or a target value of an input rotational speed of the continuously variable transmission mounted on a vehicle, is set such that a speed ratio is changed in a stepped manner and in which the continuously variable transmission is controlled such that the input rotational speed becomes equal to the target input rotational speed, the method comprising the steps of:

(a) setting, via an electronic control unit, at a timing the speed ratio is changed to an upshift side in a stepped manner, the target input rotational speed to a value lower than a current input rotational speed;

(b) obtaining, via the electronic control unit, a current vehicle speed range corresponding to a current accelerator operation amount and a current vehicle speed from a plurality of vehicle speed ranges that are determined for each accelerator operation amount by dividing a possible vehicle speed range for the accelerator operation amount into a plurality of ranges;

(c) obtaining, via the electronic control unit, an increase gradient corresponding to the current accelerator operation amount and the current vehicle speed range obtained in the step (b) from increase gradients of the input rotational speed which are determined for the plurality of vehicle speed ranges for each accelerator operation amount; and (d) setting, via the electronic control unit, the target input rotational speed such that the input rotational speed changes according to the increase gradient obtained in the step (c), wherein the steps (b), (c), and (d) are performed at predetermined time intervals after the target input rotational speed is set in the step (a).

* * * * *